(12) United States Patent
Tinnakornsrisuphap et al.

(10) Patent No.: US 9,445,334 B2
(45) Date of Patent: Sep. 13, 2016

(54) SWITCHING BETWEEN RADIO ACCESS TECHNOLOGIES AT A MULTI-MODE ACCESS POINT

(75) Inventors: Peerapol Tinnakornsrisuphap, San Diego, CA (US); Mehmet Yavuz, San Diego, CA (US); Gerardo Giaretta, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/450,389

(22) Filed: Apr. 18, 2012

(65) Prior Publication Data

US 2013/0102313 A1  Apr. 25, 2013

Related U.S. Application Data

(60) Provisional application No. 61/477,491, filed on Apr. 20, 2011.

(51) Int. Cl.
*H04W 36/00* (2009.01)
*H04W 72/00* (2009.01)
*H04M 1/00* (2006.01)
*H04W 36/22* (2009.01)
*H04W 88/10* (2009.01)

(52) U.S. Cl.
CPC ............. *H04W 36/22* (2013.01); *H04W 88/10* (2013.01)

(58) Field of Classification Search
CPC ... H04W 36/30; H04W 36/22; H04W 36/14; H04W 84/045; H04W 88/10
USPC .............................. 455/436, 444, 453, 552.1
See application file for complete search history.

(56) References Cited

U.S. PATENT DOCUMENTS

| | | | |
|---|---|---|---|
| 8,644,206 B2 | 2/2014 | Krishnaswamy et al. | |
| 2006/0268711 A1 | 11/2006 | Doradla et al. | |
| 2007/0081494 A1 | 4/2007 | Petrescu et al. | |
| 2007/0155344 A1* | 7/2007 | Wiessner | H04B 1/006 455/78 |
| 2008/0205341 A1* | 8/2008 | Koh et al. | 370/331 |
| 2009/0046644 A1* | 2/2009 | Krishnaswamy et al. | 370/329 |
| 2009/0253426 A1* | 10/2009 | Qiu et al. | 455/426.1 |
| 2010/0003921 A1 | 1/2010 | Godlewski et al. | |

(Continued)

FOREIGN PATENT DOCUMENTS

| | | |
|---|---|---|
| CN | 101185264 A | 5/2008 |
| CN | 101964979 A | 2/2011 |
| EP | 0851633 A2 | 7/1998 |
| EP | 2348774 A1 | 7/2011 |
| JP | 2009246476 A | 10/2009 |
| JP | 2010114743 A | 5/2010 |

(Continued)

OTHER PUBLICATIONS

International Search Report and Written Opinion—PCT/US2012/034563—ISA/EPO—Jun. 15, 2012.

*Primary Examiner* — Omoniyi Obayanju
(74) *Attorney, Agent, or Firm* — Fariba Yadegar-Bandari

(57) ABSTRACT

A multi-mode access point supports different radio access technologies (e.g., Wi-Fi and cellular) for serving multi-mode access terminals. To provide improved service for such an access terminal, the access point may redirect the access terminal from a first type of radio access technology to a second type of radio access technology under certain circumstances. A decision to invoke such a redirection may be based on, for example, at least one of: traffic conditions on the first type of radio access technology, traffic conditions on the second type of radio access technology, and whether a backhaul for the access point is currently a bottleneck for access point communication.

63 Claims, 11 Drawing Sheets

(56) References Cited

U.S. PATENT DOCUMENTS

| | | |
|---|---|---|
| 2010/0118844 A1 | 5/2010 | Jiao et al. |
| 2010/0120439 A1 | 5/2010 | Hashimoto et al. |
| 2010/0296487 A1 | 11/2010 | Karaoguz et al. |
| 2010/0296498 A1 | 11/2010 | Karaoguz et al. |
| 2010/0317357 A1 | 12/2010 | Miki et al. |
| 2011/0019639 A1* | 1/2011 | Karaoguz et al. ............ 370/331 |
| 2011/0201285 A1 | 8/2011 | Giaretta et al. |
| 2011/0258319 A1 | 10/2011 | Efthymiou et al. |
| 2011/0292914 A1* | 12/2011 | Sachs et al. .................. 370/332 |
| 2011/0314145 A1 | 12/2011 | Raleigh et al. |
| 2014/0043979 A1* | 2/2014 | Etemad et al. ............... 370/237 |

FOREIGN PATENT DOCUMENTS

| | | |
|---|---|---|
| JP | 2010515350 A | 5/2010 |
| JP | 2010213013 A | 9/2010 |
| JP | 2011019006 A | 1/2011 |
| JP | 2011503982 A | 1/2011 |
| JP | 2012015898 A | 1/2012 |
| WO | 2008085327 A1 | 7/2008 |
| WO | 09026033 | 2/2009 |
| WO | 2009057782 A1 | 5/2009 |
| WO | 2009059727 A1 | 5/2009 |
| WO | 2009067297 A1 | 5/2009 |
| WO | 2010035636 A1 | 4/2010 |

* cited by examiner

SWITCHING BETWEEN RADIO ACCESS TECHNOLOGIES AT A MULTI-MODE ACCESS POINT

CLAIM OF PRIORITY

This application claims the benefit of and priority to commonly owned U.S. Provisional Patent Application No. 61/477,491, filed Apr. 20, 2011, and assigned the disclosure of which is hereby incorporated by reference herein.

BACKGROUND

1. Field

This application relates generally to wireless communication and more specifically, but not exclusively, to a multi-mode access point that supports multiple radio access technologies.

2. Introduction

A wireless communication network may be deployed by an operator over a defined geographical area to provide various types of services (e.g., voice, data, multimedia services, etc.) to users within that geographical area. In a typical implementation, macro access points (e.g., each of which corresponds to one or more macrocells) are distributed throughout a network to provide wireless connectivity for access terminals (e.g., cell phones) that are operating within the geographical area served by the operator's network.

A macro network deployment is carefully planned, designed and implemented to offer good coverage over the geographical area. Even with such careful planning, however, such a deployment may not completely accommodate channel characteristics such as path loss, fading, multipath, shadowing, etc., in indoor and potentially other environments. Consequently, macrocell users may face coverage issues (e.g., call outages and quality degradation) indoors and at other locations, resulting in poor user experience.

To supplement conventional network access points (e.g., macrocells) and provide enhanced performance, low-power access points may be deployed to provide coverage for access terminals over relatively small coverage areas. For example, a low-power access point installed in a user's home or in an enterprise environment (e.g., commercial buildings) may provide voice and high speed data service for access terminals supporting cellular radio communication (e.g., CDMA, WCDMA, UMTS, LTE, etc.).

In various implementations, low-power access points may be referred to as, for example, femtocells, femto access points, home NodeBs, home eNodeBs, access point base stations, picocells, etc. In some implementations, such low-power access points are connected to the Internet and the mobile operator's network via a Digital Subscriber Line (DSL), cable internet access, T1/T3, or some other suitable means of connectivity. In addition, a low-power access point may offer typical access point functionality such as, for example, Base Transceiver Station (BTS) technology, a radio network controller, and gateway support node services. While the use of low-power access points helps alleviate coverage issues associated with an operator's network, these types of access points are not widely deployed in many areas.

Moreover, due to network constraints, an operator's network may not effectively support traffic that has a high data rate. For example, through the use of data throttling and/or data usage caps, a wireless network operator may discourage users from accessing high bandwidth applications (e.g., video, downloads, etc.) via a cell phone.

To address these coverage and/or bandwidth constraints, some types of access terminals support multiple modes of operation. For example, an access terminal may support wireless wide area network (WWAN) service (e.g., cellular service) and at least one other type of wireless service (e.g., Wi-Fi). Such a multi-mode access terminal may thus use different wireless services at different times depending on the coverage and/or level of service provided by the different wireless services. For example, a dual-mode cell phone that supports cellular and Wi-Fi service typically defaults to Wi-Fi service whenever Wi-Fi service is available. In this way, the cell phone is able to take advantage of higher peak data rates typically provided by Wi-Fi and, at the same time, reduce load on cellular systems to operators and reduce usage charges (e.g., corresponding to minute and/or data usage) associated with the WWAN service to the users.

Although Wi-Fi service may support higher peak data rates than cellular service, Wi-Fi access may be susceptible to spurious radio interference since Wi-Fi utilizes unlicensed (and, hence, relatively unmanaged) radio spectrum. For example, one source of interference may be in-home interferers such as various consumer electronic devices (e.g. television sets, personal computers, game consoles, etc.) that are Wi-Fi enabled. Another source of interference may be neighborhood interferers such as other Wi-Fi consumer electronic devices deployed in nearby homes, apartments, and other buildings. In general, such sources of interference may degrade Wi-Fi access.

Also, Wi-Fi service may be less predictable than cellular service. For example, as mentioned above, an access terminal (e.g., a smartphone) may always connect to a known Wi-Fi access if it is found. In addition, such an access terminal will typically turn off Wi-Fi access when the display screen of the access terminal is turned-off and instead use a cellular data mode to reduce battery consumption. One rationale for this approach is based on an assumption that the Wi-Fi data rate is only needed when the user is interacting with the access terminal In practice, however, the above approaches are not always the best operational choice. For example, as discussed above, Wi-Fi is subject to significant and unpredictable interference. Hence, automatically selecting Wi-Fi whenever it is present may not always provide the best service for a given user. In addition, the on/off status of the display screen of an access terminal may not provide the best indication of subsequent background/interactive behavior of the access terminal. For example, certain access terminals (e.g. Mirasol-based devices) may have their display screen on all the time. In view of the above, a need exist for more effective scheme for supporting multi-mode access terminals.

SUMMARY

A summary of several sample aspects of the disclosure follows. This summary is provided for the convenience of the reader and does not wholly define the breadth of the disclosure. For convenience, the term some aspects may be used herein to refer to a single aspect or multiple aspects of the disclosure.

The disclosure relates in some aspects to a multi-mode access point that supports different radio access technologies such as Wi-Fi and cellular for communicating with multi-mode access terminals. In some aspects, such an access point causes communication with an access terminal to switch from one radio access technology to another under certain conditions. For example, the access point may redirect a cellular-capable access terminal from Wi-Fi to cellular if the Wi-Fi is congested and the backhaul for the access point is not a bottleneck. The access point may then redirect the access terminal back to Wi-Fi when the Wi-Fi congestion condition has recovered. In some cases, the redirection of an access terminal to a different RAT is referred to as offloading the access terminal to the other RAT. Similar redirection operations may be employed in the opposite direction as well (e.g., to offload an access terminal from cellular technology to Wi-Fi technology).

An access point may have visibility on various network attributes that are indicative of congestion and, hence, may be used to determine whether to offload an access terminal For example, a decision to redirect an access terminal may be based on one or more of the following factors: throughput on the Wi-Fi channel and/or the cellular channel, interference on the Wi-Fi channel and/or the cellular channel, the number of active devices on the Wi-Fi channel and/or the cellular channel, backhaul utilization (e.g., redirection may be invoked if the access point's backhaul is not a bottleneck). Examples of information that may indicative of one or more of the above include, without limitation: received signal strength indication (RSSI) observed on a Wi-Fi radio channel, the number of request-to-send (RTS) and/or clear-to-send (CTS) messages observed on the Wi-Fi channel, buffer (or queue) status; or the types of services (e.g., traffic) that the access terminal is using (e.g., Voice-over-Internet Protocol (VoIP), video streaming, Web browsing, keep-alive operations, etc.).

In some aspects, the access point may redirect an access terminal to another type of radio access technology (e.g., from Wi-Fi to cellular) through the use of one or more of the techniques that follow. In some implementations, the access point revokes the Internet Protocol (IP) address assigned to the access terminal for communication using a first type of radio access technology (e.g., Wi-Fi), and does not assign a new IP address for this communication. In some implementations, the access point filters (e.g., blocks) traffic associated with a media access control (MAC) address assigned to the access terminal for communication using a first type of radio access technology (e.g., Wi-Fi). In some implementations, the access point disables a service set identifier (SSID) previously used for communication using a first type of radio access technology (e.g., Wi-Fi). In this case, the access point may create multiple SSIDs. For example, an SSID that is allocated for use by multi-mode access terminals (e.g., smartphones) may be enabled or disabled dynamically to facilitate offloading as taught herein. Another SSID which is a permanent SSID may be allocated for use by devices that only support Wi-Fi technology. In some implementations, the access point sends a message to the access terminal to cause an application on the access terminal to enable/disable communication via the different types of radio access technology.

The disclosure thus relates in some aspects to intelligent offload in an integrated multi-mode access point (e.g., a femtocell-Wi-Fi access point). The use of such an access point may improve (e.g., optimize) access terminal performance through the use of access point visibility on network congestion and air interface congestion. For example, the access point may use such information to select a radio access technology that is most appropriate for the state of the radio environment at a particular time. Advantageously, this may be accomplished without explicit support from the access terminal or any core network elements. It should be appreciated that these and any other advantages discussed herein are not exclusive as other advantages may become obvious to one skilled in the art through the present disclosure.

In view of the above, communication for a multi-mode access point involves, in some aspects: communicating with an access terminal using a first type of radio access technology; determining at least one indication indicative of traffic conditions associated with the first type of radio access technology; determining to switch to a second type of radio access technology instead of the first type of radio access technology based on the at least one indication; and communicating with the access terminal using the second type of radio access technology as a result of the determination to switch to the second type of radio access technology.

BRIEF DESCRIPTION OF THE DRAWINGS

These and other sample aspects of the disclosure will be described in the detailed description and the claims that follow, and in the accompanying drawings, wherein:

Figure 1:
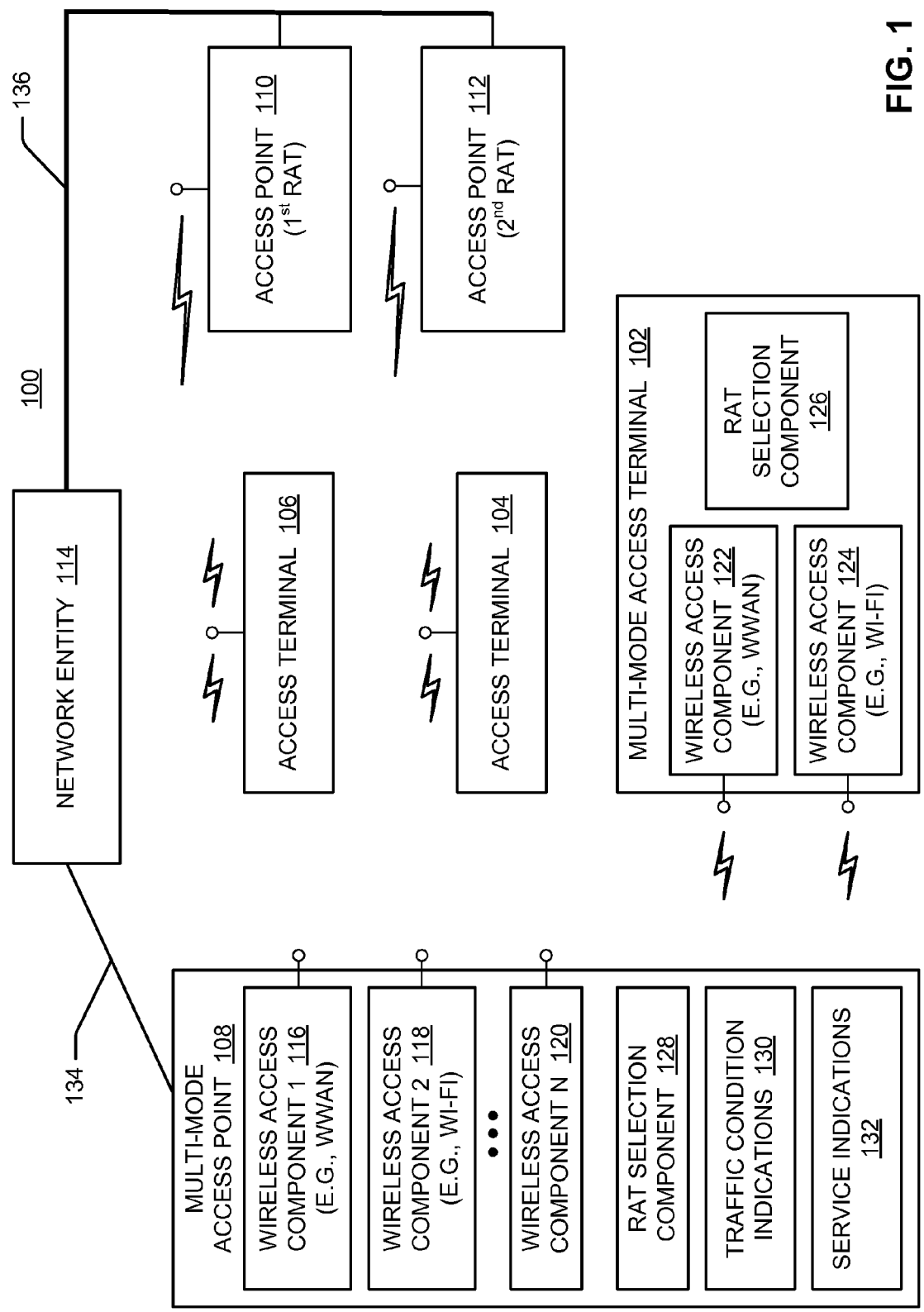
FIG. 1 is a simplified block diagram of several aspects of an example of communication system where a multi-mode access point provides service for access terminals.

In accordance with common practice the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

Various aspects of the disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim.

FIG. 1 illustrates several nodes of a sample communication system 100 (e.g., a wireless communication network). For illustration purposes, various aspects of the disclosure will be described in the context of one or more access terminals, access points, and network entities that communicate with one another. It should be appreciated, however, that the teachings herein may be applicable to other types of apparatuses or other similar apparatuses that are referenced using other terminology. For example, in various implementations access points may be referred to or implemented as base stations, NodeBs, eNodeBs, Home NodeBs, Home eNodeBs, macrocells, femtocells, and so on, while access terminals may be referred to or implemented as user equipment (UEs), mobiles, and so on.

Access points in the system 100 provide access to one or more services (e.g., network connectivity) for one or more wireless terminals (e.g., access terminals 102, 104, and 106) that may be installed within or that may roam throughout a coverage area of the system 100. For example, at various points in time the access terminal 102 may connect to an access point 108, an access point 110, an access point 112, or some access point in the system 100 (not shown). Similarly, at various points in time the access terminal 104 and/or the access terminal 106 may connect to one these access points.

The access points of the system 100 may employ the same or different radio access technologies (RATs). For example, the access points 110 and 112 may support different RATs. However, the access point 108 may support the RAT supported by the access point 110 and the RAT supported by the access point 112.

As represented in a simplified manner by the lines 134 and 136, each of the access points may communicate over various communication links with one or more network entities (represented, for convenience, by a network entity 114), including each other, to facilitate wide area network (WAN) connectivity. Typically, such a WAN link is referred to as a backhaul link or, simply, the backhaul.

The network entities may take various forms such as, for example, one or more radio and/or core network entities. Thus, in various implementations the network entities may represent functionality such as at least one of: network management (e.g., via an operation, administration, management, and provisioning entity), call control, session management, mobility management, gateway functions, interworking functions, radio resource management, or some other suitable network functionality. Also, two or more of these network entities may be co-located and/or two or more of these network entities may be distributed throughout a network. Various communication technologies may be employed by a given network entity to communicate with other network entities (e.g., intra-RAT and/or inter-RAT). In addition, the network entities may comprise part of a Session Initiation Protocol (SIP) based circuit-switched network, an Interoperability Specification (IOS) based circuit-switched network, a packet-switched network, or some other suitable wireless communication network.

Some of the access points (e.g., the access point 108) in the system 100 may comprise low-power access points. A low-power access point will have a maximum transmit power that is less (e.g., by an order of magnitude) than a maximum transmit power of any macro access point in a given coverage area. In some embodiments, low-power access points such as femtocells may have a maximum transmit power of 20 dBm or less. In some embodiments, low-power access points such as picocells may have a maximum transmit power of 24 dBm or less. In contrast, a macrocell may have a maximum transmit power of 43 dBm. It should be appreciated, however, that these or other types of low-power access points may have a higher or lower maximum transmit power in other embodiments. For convenience, low-power access points may be referred to as femtocells or femto access points in the discussion that follows. Thus, it should be appreciated that any discussion related to femtocells or femto access points herein may be equally applicable, in general, to low-power access points or other types of access points.

In accordance with the teachings herein, the access point 108 supports multi-mode communication. To this end, the access point 108 includes several wireless access components that support different wireless access modes that employ different types of radio access technology (RAT). Specifically, the wireless access component 116 supports a first type of RAT (e.g., WWAN technology), the wireless access component 118 supports a second type of RAT (e.g., Wi-Fi), and other wireless access components (represented by the wireless access component 120) support up to "N" other types of radio access technologies.

One or more of the access terminals in the system 100 also support multi-mode communication. For example, the access terminal 102 includes several wireless access components that support different wireless access modes that employ different RATs. In this example, the wireless access component 122 supports a first type of RAT (e.g., WWAN technology) and the wireless access component 124 supports a second type of RAT (e.g., Wi-Fi). The access terminal 102 also includes a RAT selection component 126 that selects one of the radio access technologies for communication with an access point based on a specified criterion or specified criteria. For example, as discussed above, Wi-Fi may be selected whenever Wi-Fi service is detected and the display of the access terminal 102 is turned-on.

The access point 108 also includes a RAT selection component 128 that determines whether to switch the RAT being used to serve a multi-mode access terminal (e.g., the access terminal 102). That is, the selection component 102 may take action to redirect a multi-mode access terminal from one type of RAT to another.

A decision to switch to another RAT may be based in some aspects on traffic conditions associated with one or more of the RATs and/or the backhaul. To this end, the RAT selection component 128 may determine and maintain indications 130 that are indicative of such traffic conditions. For example, an indication may be determined based on information acquired via wireless communications (e.g., based on signals transmitted by the access terminals and/or the access points of the system 100) and/or based on backhaul communications (e.g., communications over the backhaul link 134).

A decision to switch to another RAT may be based in some aspects on the type of service (e.g., streaming, Web browsing, voice call, etc.) requested by an access terminal Accordingly, the RAT selection component 128 also may determine (e.g., based on information acquired via wireless and/or backhaul communication) and maintain indications 132 that are indicative of such service. In some cases, the type of service requested corresponds to a specific type of traffic. Consequently, a decision to switch to another RAT may be based the type of traffic used for communication between the access point and the access terminal The access point 108 will take different forms in different implementations. In some implementations, the access point 108 comprises a single device. For example, the access point 108 may comprise a femtocell that provides wireless wide area network (WWAN) service (e.g., cellular service based on cdma2000, GSM, UMTS, LTE, etc.) and at least one other type of wireless service (e.g., Wi-Fi, WiMAX, etc.). In other implementations, the access point 108 comprises a plurality of co-located devices, each of which may support a different type of RAT. For example, one device may provide WWAN service, while at least one other device provides at least one other type of wireless service. It should be appreciated that different combinations of wireless service and/or a different number of devices may be employed in other embodiments consistent with the teachings herein.

In the case where a multi-mode access point comprises co-located devices, it is generally desirable for the different devices to provide comparable areas of coverage (e.g., overlapping with respects to the coverage of at least one of the devices). In this way, it may be assured that an access terminal can be switched from one RAT to another. To this end, the co-located devices are located within approximately 2 meters of one another in a typical implementation.

In addition, the co-located devices communicate with one another via point-to-point communication. For example, point-to-point communication may comprise inter-process communication, local area network subnet communication, or local bus (e.g., USB) communication.

Sample operations that may be employed in accordance with the teachings herein will now be described in more detail in conjunction with the flowcharts of FIGS. 2-4. For convenience, the operations of FIGS. 2-4 (or any other operations discussed or taught herein) may be described as being performed by specific components (e.g., components of FIG. 1, FIG. 5, FIG. 6, etc.). It should be appreciated, however, that these operations may be performed by other types of components and may be performed using a different number of components. It also should be appreciated that one or more of the operations described herein may not be employed in a given implementation.

Figure 2:
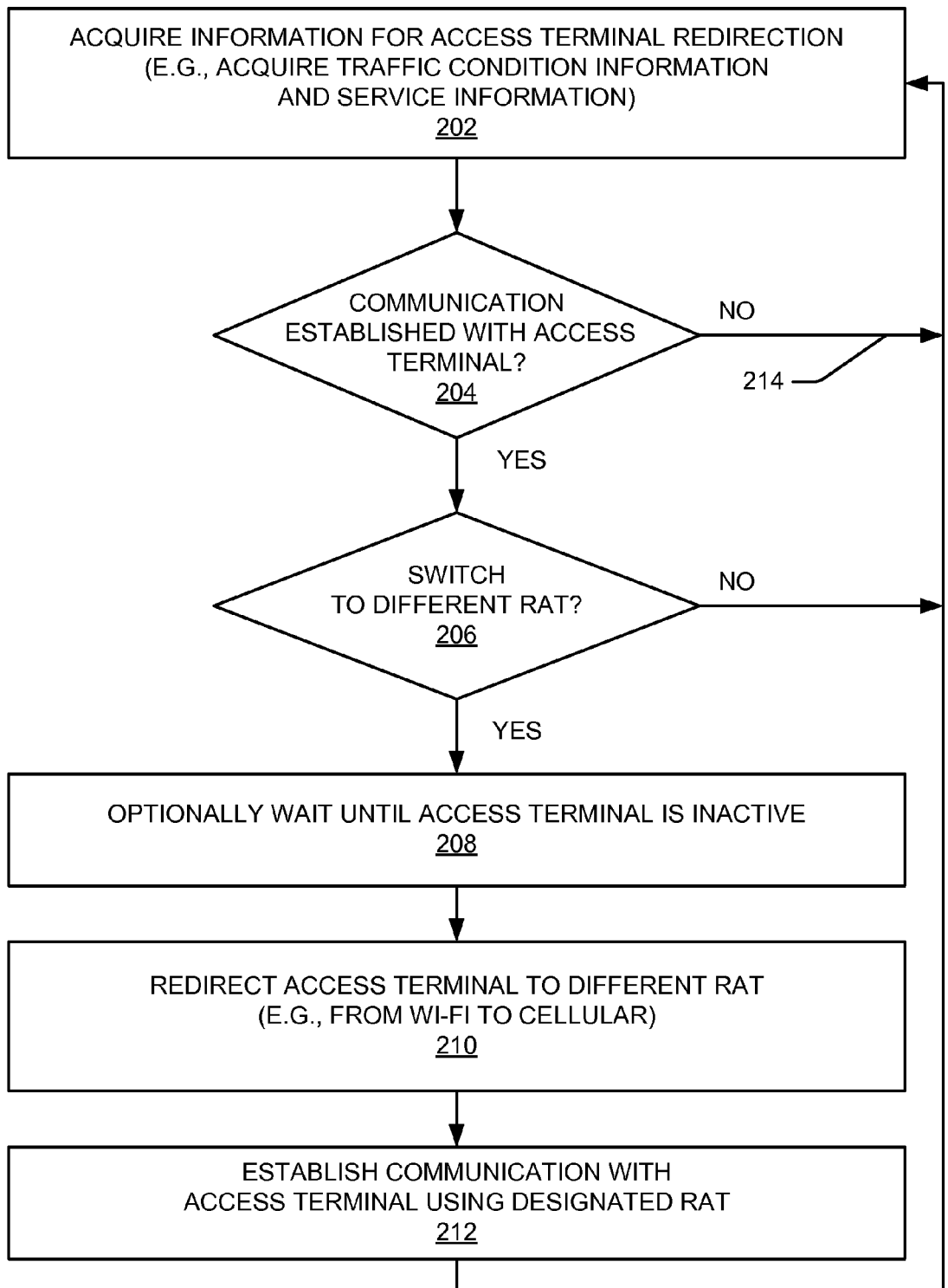
FIG. 2 is a flowchart of several aspects of an example of operations performed in conjunction with switching between different radio access technologies.

Referring initially to FIG. 2, this flowchart illustrates an overview of switching between RATs when communicating with an access terminal.

A multi-mode access point (e.g., a femtocell with Wi-Fi capability) has access to various types of information that may be used as a basis to decide whether to redirect an access terminal to another RAT. This information may be acquired before and/or after the access terminal has established communication with the access point. Advantageously, this information may be readily available to the access point and the access point may acquire the information during the course of normal operations. Consequently, a RAT switching scheme based on the teachings herein may be more efficient than a RAT switching scheme that requires extra measurements and/or other operations to be performed to acquire information (e.g., at an access terminal) for determining when to switch RATs.

As represented by block 202, at various points in time, the access point may acquire one or more of: information indicative of traffic conditions associated with the different RATs supported by the access point, information indicative of traffic conditions associated with the backhaul, information indicative of the types of services to be provided to one or more access terminals, or some other type of information that is used to determine whether to switch to different RAT.

In some cases, the acquired information is indicative of traffic congestion. The type of information acquired here may depend on the type of communication link (e.g., RAT or backhaul) for the traffic.

In cases where the RAT is Wi-Fi technology, one or more of the factors that follow may be indicative of congestion on a Wi-Fi channel. As discussed in more detail below, an access point may elect to redirect an access terminal away from Wi-Fi technology if there is congestion on a Wi-Fi channel.

High RSSI associated with a Wi-Fi channel on which the access point is operating is indicative of traffic congestion in some cases (e.g., in cases where the access point is not communicating with the access terminal on that channel). Accordingly, the access point (e.g., a Wi-Fi transceiver) may measure the received signal strength on the channel over time and maintain information (e.g., an RSSI value) indicative of the measured received signal strength.

Low throughput over a Wi-Fi channel may be indicative of congestion on that channel. Thus, the access point may measure throughput (e.g., uplink and/or downlink throughput) over time and maintain a record of this throughput. In addition, or alternatively, the access point may receive throughput information from an access terminal that monitors such information. For example, an access terminal may send this information to the access point via application layer messages.

The presence of a large number of active devices on a Wi-Fi channel also may be indicative of traffic congestion on that channel. Accordingly, the access point may keep track of the number of active devices over time.

A high rate of request-to-send (RTS), clear-to-send (CTS) messages, or other types of access messages observed on a Wi-Fi channel may be indicative of traffic congestion. Accordingly, an access point may monitor a Wi-Fi channel over a period of time and maintain a record of the number of message detected over that period of time. Here, the access point may keep track of the messages from devices that are connected to the access point and/or messages from devices that are not connected to the access point.

Link condition information also may be indicative of traffic congestion. For example, another indication that may be used is the Modulation and Coding Scheme (MCS) index. Low MCS indicates that the link condition to the access terminal is not good (e.g., due to interference) and the access terminal may be better off on cellular.

A high packet loss rate on a Wi-Fi channel may be indicative of congestion on that channel. Here, the access point may identify lost packets over time and maintain a record of the packet loss rate. In addition, or alternatively, the access point may receive packet loss rate information from an access terminal that maintains such information.

A large downlink buffer at the access point may be indicative of traffic congestion on a Wi-Fi channel. That is, the downlink buffer(s) at the access point may tend to fill up if the data in a buffer cannot be sent out at a sufficient rate. Accordingly, the access point may maintain a record of buffer status over time. In addition, or alternatively, the access point may receive buffer status information from an access terminal that maintains such information for the uplink.

If the access point has assigned a large number of IP addresses, this factor may be indicative of traffic congestion on a Wi-Fi channel. Here, the assignment of a large number of IP addresses may indicate that a large number of Wi-Fi devices are using the channel and/or that a large number of applications are using the channel. Accordingly, the access point may maintain a record of the number of AP addresses assigned over time.

In cases where the RAT is cellular technology (e.g., provided by a femtocell), one or more of the factors that follow may be indicative of congestion on a channel. As discussed in more detail below, an access point may elect to not redirect an access terminal to cellular technology if there is congestion on the target cellular channel.

High uplink interference on a cellular channel (e.g., a femto channel) may be indicative of congestion on that channel. An access point may determine this interference, for example, through the use of a network listen module (NLM) that monitors channel quality (e.g., RSSI) on an uplink channel.

Low throughput over a cellular channel may be indicative of congestion on that channel. Thus, the access point may measure throughput (e.g., uplink and/or downlink throughput) over time and maintain a record of this throughput. In addition, or alternatively, the access point may receive throughput information from an access terminal that monitors such information. For example, an access terminal may send this information to the access point via application layer messages.

The presence of a large number of active devices on a cellular channel also may be indicative of traffic congestion on that channel. Accordingly, the access point may keep track of the number of active devices over time.

A large queue for a downlink scheduler at the access point may be indicative of traffic congestion on a cellular channel. That is, the downlink queue(s) at the access point may tend to fill up if the data in a queue cannot be sent out at a sufficient rate. Accordingly, the access point may maintain a record of queue status over time. In addition, or alternatively, the access point may receive queue status information from an access terminal that maintains such information for the uplink.

If the access point has established a large number of connections, this factor may be indicative of traffic congestion on a cellular channel. Here, the presence of a large number of connections may indicate that a large number of cellular devices are using the channel and/or that a large number of applications are using the channel. Accordingly, the access point may maintain a record over time of the number of connections that have been established.

For the backhaul, one or more of the factors that follow may be indicative of congestion. As discussed in more detail below, an access point may condition whether to redirect an access terminal to a different type of RAT based on whether there is congestion on the backhaul. For example, if the backhaul is a bottleneck, no gain in performance may be achieved by switching RATs. Hence, a redirection may not be initiated if the backhaul congestion is high. Alternatively, redirection may be initiated to another access point that has a different backhaul or different backhauls (e.g., an access terminal may be redirected to a macro base station).

Backhaul congestion may be indicated if the aggregate cellular and Wi-Fi throughput is close to the available bandwidth on the backhaul. Accordingly, an access point may monitor the aggregate cellular and Wi-Fi throughput over time.

The access point may perform backhaul probing to detect congestion and available bandwidth on the backhaul. For example, the access point may monitor response times, download times, upload times, or other factors to measure congestion and/or bandwidth.

The access point may receive packets via the backhaul that include congestion information. For example, some types packets may include an explicit congestion notification (ECN) bit that when set indicates the presence of congestion on the backhaul.

High packet loss rate over the backhaul may be indicative of backhaul congestion. Here, the access point may identify lost packets over time and maintain a record of the packet loss rate. In addition, or alternatively, the access point may receive packet loss rate information from a network entity that receives packets from the access point via the backhaul and maintains information indicative of the packet loss rate.

Referring again to FIG. 2, as represented by the line 214 from block 204 to block 202, the access point may continue to acquire information over time prior to communication being established with an access terminal.

As represented by blocks 204 and 206, in the event communication has been established with an access terminal (e.g., an access terminal has initiated communication via a first RAT), the access point will determine whether to switch to a different RAT for the communication with the access terminal.

The determination of whether to switch at block 206 is based on the information acquired at block 202 (e.g., before and/or after communication is established with the access terminal). For example, one of more of the acquired factors may be compared with a corresponding threshold (e.g., a threshold RSSI level, a threshold throughput level, and so on). Based on this comparison or these comparisons, a decision is made as to whether the access terminal will be redirected to another RAT.

If redirection is not indicated, the operational flow proceeds back to block 202 where the access point continues to acquire information that will be used in subsequent switch decisions at block 206. In some cases, additional information may be acquired once communication is established with the access terminal For example, the access point may acquire information that is indicative of a type of service requested by the access terminal (and, hence, indicative of the type of traffic to be carried on a channel). In such a case, the decision of block 206 may be based on the type of service (or traffic). For example, if the access terminal is streaming high bandwidth content, the access point may elect to leave the access terminal on Wi-Fi service; unless the streaming originates from the operator's network, in which case, the access terminal may be left on the cellular service. If the access terminal is using VoIP, the access point may redirect the access terminal to the most reliable service available (e.g., cellular service). Also, if the access point is performing maintenance tasks (e.g., keep alive), the access point may redirect the access terminal to a more battery efficient service (e.g., cellular service). If the access terminal is Web browsing, the access point may put the access terminal on any available service.

If a decision to switch RATs is made at block 206, the operational flow proceeds to blocks 208-212. As represented by block 208, in some implementations, the access point waits until the access terminal is inactive (e.g., there is no user traffic on the Wi-Fi channel) before initiating the switch.

As represented by block 210, the access point redirects the access terminal from one RAT (e.g., Wi-Fi) to another RAT (e.g., cellular). This operation may be performed in different ways in different implementations. For example, as discussed above, this may involve revoking an IP address, disabling an SSID, filtering traffic associated with a MAC address, or sending a message (e.g., via the current RAT) to an application on the access terminal In either of these cases, the access terminal will attempt to reestablish communication with the access point using a different RAT.

Accordingly, as represented by block 212, the access point then establishes communication with the access terminal using the designated RAT. For example, the access point may receive a connection request from the access terminal on a cellular channel. In some implementations, the designated RAT may support a different data rate than the original RAT.

As represented by the line 216 in FIG. 2, the access point will continue to acquire information after the new communication is established with the access terminal In this way, the access point may monitor traffic congestion and/or other conditions to later determine whether the access terminal is to be redirected back to the original RAT (e.g., if congestion on the Wi-Fi channel diminishes). Here, the subsequent redirection may simply involve reversing the operation that invoked the initial redirection. Thus, this may involve, for example, providing an IP address for the access terminal, resuming the broadcasting of the SSID, resuming the processing of traffic associated with the MAC address, or sending a message to the application on the access terminal requesting a switch back to the original RAT.

Figure 3:
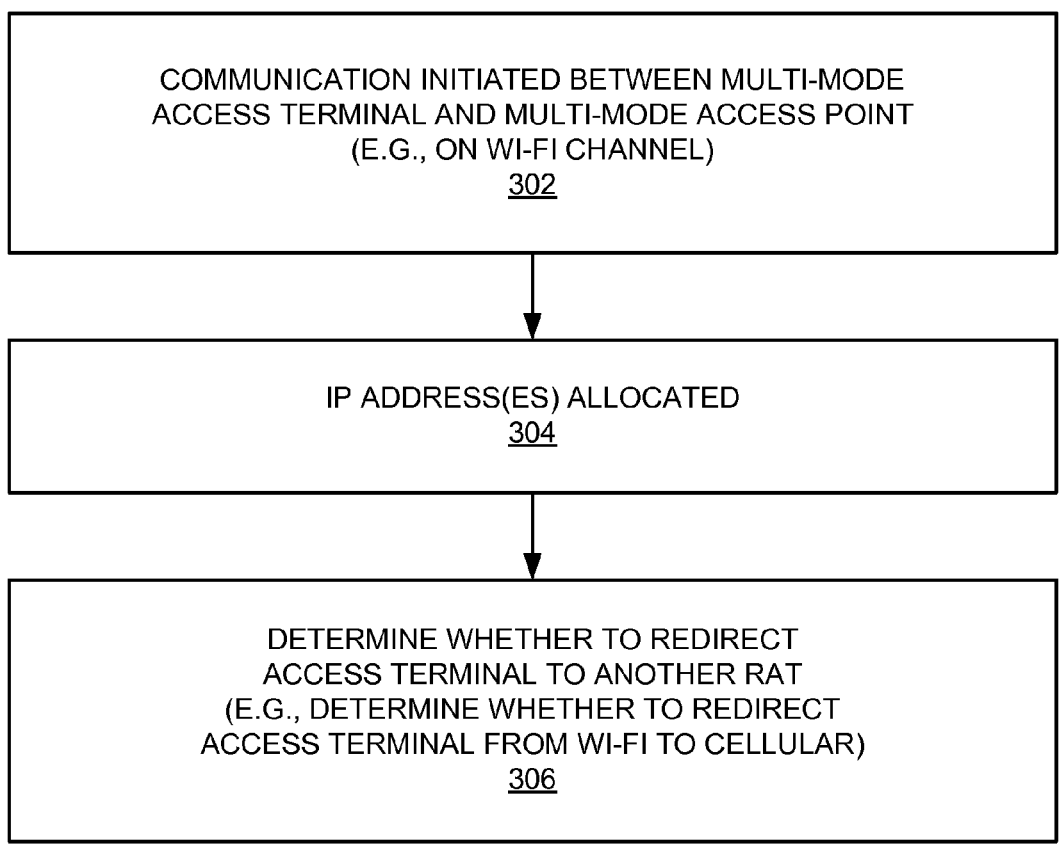
FIG. 3 is a flowchart of several aspects of another example of operations performed in conjunction with switching between different radio access technologies.

Referring now to FIG. 3, this flowchart describes several other aspects of switching between RATs when communicating with an access terminal. For purposes of illustration, these operations are described in the context of a multi-mode access point that supports Wi-Fi service and cellular service. It should be appreciated, however, that the disclosed operations may be applicable to other types of RATs as well.

As represented by block 302, at some point in time a multi-mode access terminal enters a coverage area of a multi-mode access point and initiates communication with the access point (e.g., on a Wi-Fi channel). At this time, the access point and the access terminal may learn the capabilities of one another. Thus, each device will detect the multi-mode property of the other device.

As represented by block 304, in conjunction with initiating service for the access terminal, the access point may allocate one or more IP addresses for the access terminal For example, a Wi-Fi component of the access point will assign an IP address for communication over a Wi-Fi channel. In addition, if the access point supports local IP access (LIPA), the access point may allocate an IP address for the access terminal to access this service via a cellular channel.

In some implementations, to reduce the likelihood that an IP connection will be broken by a switch from Wi-Fi to cellular or vice versa, the access point may allocate the same IP address for both Wi-Fi and cellular. For example, the same local IP address may be assigned on both Wi-Fi mode and local IP access mode for a given access terminal to prevent interruption to applications that cannot survive an IP address change. Local IP access may be established before or after Wi-Fi mode has been disabled.

As represented by block 306, at some point in time, a determination as to whether the access terminal is to be redirected to another RAT is made. In some implementations, this determination is made based solely on the one or more of the criteria discussed above in conjunction with FIG. 2.

In other implementations, the determination of block 306 takes into account the capabilities of other access terminals being served by the access point. For example, some access terminals may only have a cellular interface (e.g., Wi-Fi access is not supported). In this case, any multi-mode access terminals that support Wi-Fi access may be redirected by the access point to use Wi-Fi access mode for IP access even if the Wi-Fi traffic conditions are relatively poor.

In still other implementations, the determination of block 306 takes into account the traffic requirements of the access terminal's applications. For example, to support DLNA streaming from an access terminal (e.g., to a nearby television, etc.), the access point may provide a DLNA proxy and take action to learn the DLNA capability of the access terminal based on DLNA advertisement packets transmitted by the access terminal The access point may then trigger the access terminal to activate Wi-Fi access mode when streaming is required. Otherwise, the access point may allow the access terminal to remain in cellular access mode whenever the access terminal is idle. In some aspects, the DLNA proxy over cellular access mode may help reduce battery consumption in Wi-Fi access mode and frequency keep-alive operations for DLNA.

Figure 4:
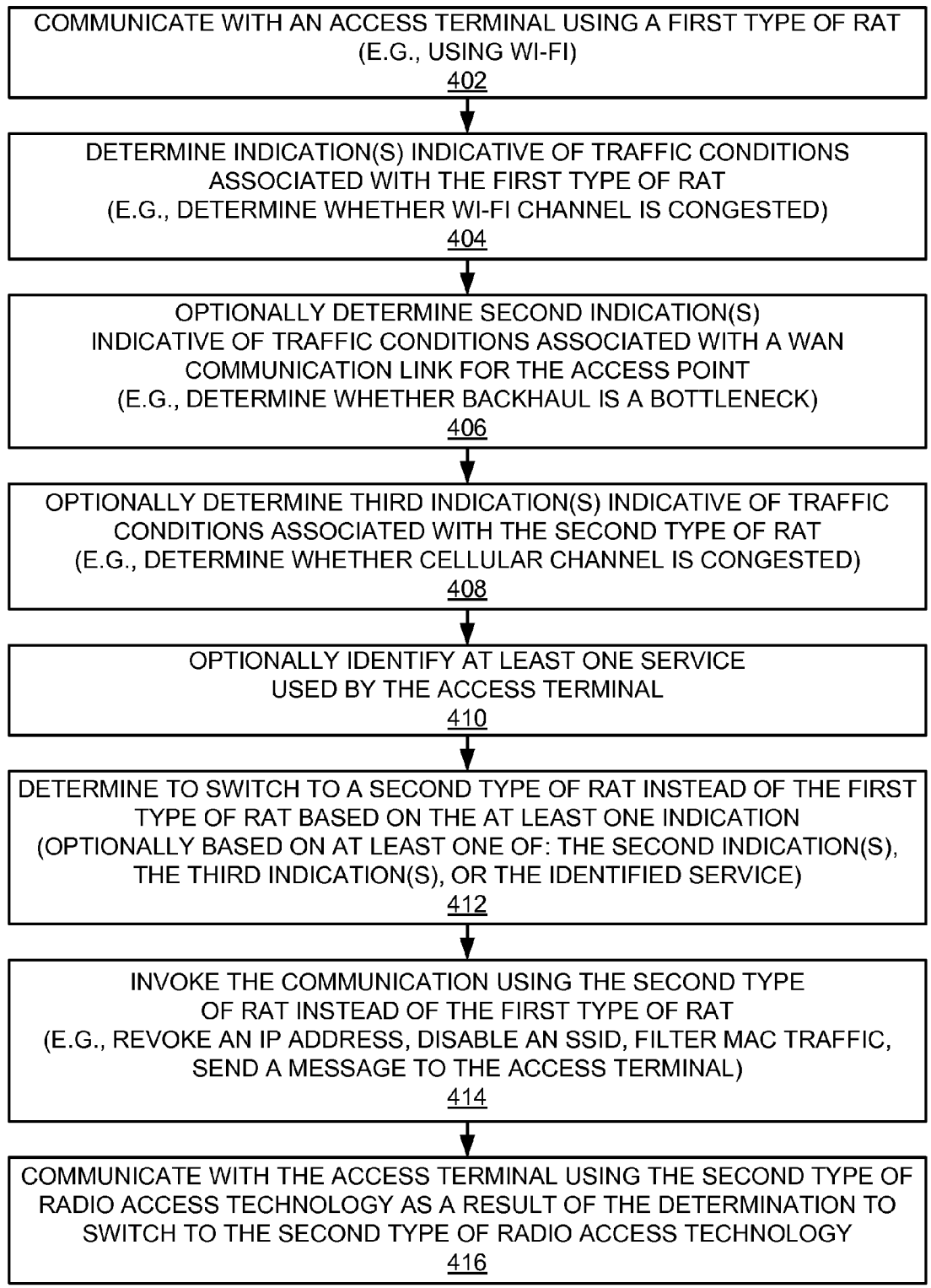
FIG. 4 is a flowchart of several aspects of another example of operations performed in conjunction with switching between different radio access technologies.

The flowchart of FIG. 4 describes various operations that may be performed, for example, by a multi-mode access point in accordance with the teachings herein.

As represented by block 402, communication with an access terminal initially uses a first type of radio access technology. For example, the access terminal may initiate communication with a multi-mode access point over a Wi-Fi channel.

As represented by block 404, at least one indication indicative of traffic conditions associated with the first type of radio access technology is determined As discussed herein, in some cases, the at least one indication is indicative of whether a communication channel established between the access point and the access terminal using the first type of radio access technology is congested. In some cases, the at least one indication comprises at least one of: throughput, interference, a number of active devices, RSSI, a quantity of transmitted access messages (e.g., RTS/CTS), buffer status, packet loss rate, or any other factor discussed herein (e.g., in conjunction with block 202 above).

As represented by block 406, in some implementations, at least one second indication indicative of traffic conditions associated with a wide area network (WAN) communication link for the access point is determined In some cases, the WAN communication link comprises at least one backhaul link for the access point. Thus, the at least one second indication may indicate whether the at least one backhaul link is a bottleneck for communications served by the access point.

As represented by block 408, in some implementations, at least one third indication indicative of traffic conditions associated with the second type of radio access technology is determined For example, a determination may be made as to whether the cellular channel is congested so that an access terminal will not be redirected to a congested channel.

As represented by block 410, in some implementations, at least one service used by the access terminal is identified. For example, as discussed above, the type of service requested by the access terminal may be a factor in deciding whether to redirect an access terminal to a different RAT.

As represented by block 412, a determination to switch to a second type of radio access technology instead of the first type of radio access technology is made based on the indication(s) determined at block 404. This determination may be made, for example, based on one of more of the criteria discussed above in conjunction with FIG. 2 (e.g., at block 206). Thus, in various implementations, the determination to switch to the second type of radio access technology is further based on at least one of: the second indication(s) determined at block 406, the third indication(s) determined at block 408, or the service(s) identified at block 410.

As represented by block 412, communication using the second type of radio access technology is invoked instead of the first type of radio access technology. As discussed above (e.g., at block 210), this operation may be accomplished in different ways in different implementations. For example, the access terminal may be redirected to the second type of radio access technology by revoking an IP address associated with the access terminal for the communication using the first type of wireless communication. As another example, an SSID advertized by the access point for the communication using the first type of radio access technology may be revoked. Here, the disabled SSID may be one of a plurality of SSIDs advertized by the access point for the first type of radio access technology. As yet another example, the access terminal may be redirected to the second type of radio access technology by filtering traffic sent via the first type of wireless communication if the traffic is associated with a MAC address assigned to the access terminal In addition, redirection may be achieved by sending a message to the access terminal to trigger the access terminal (e.g., the component 126 of FIG. 1) to switch to a designated RAT.

As represented by block 416, as a result of the determination to switch to the second type of radio access technology, communication with the access terminal now uses the second type of radio access technology. For example, the access terminal may communicate with the access point over a cellular channel.

Figure 5:
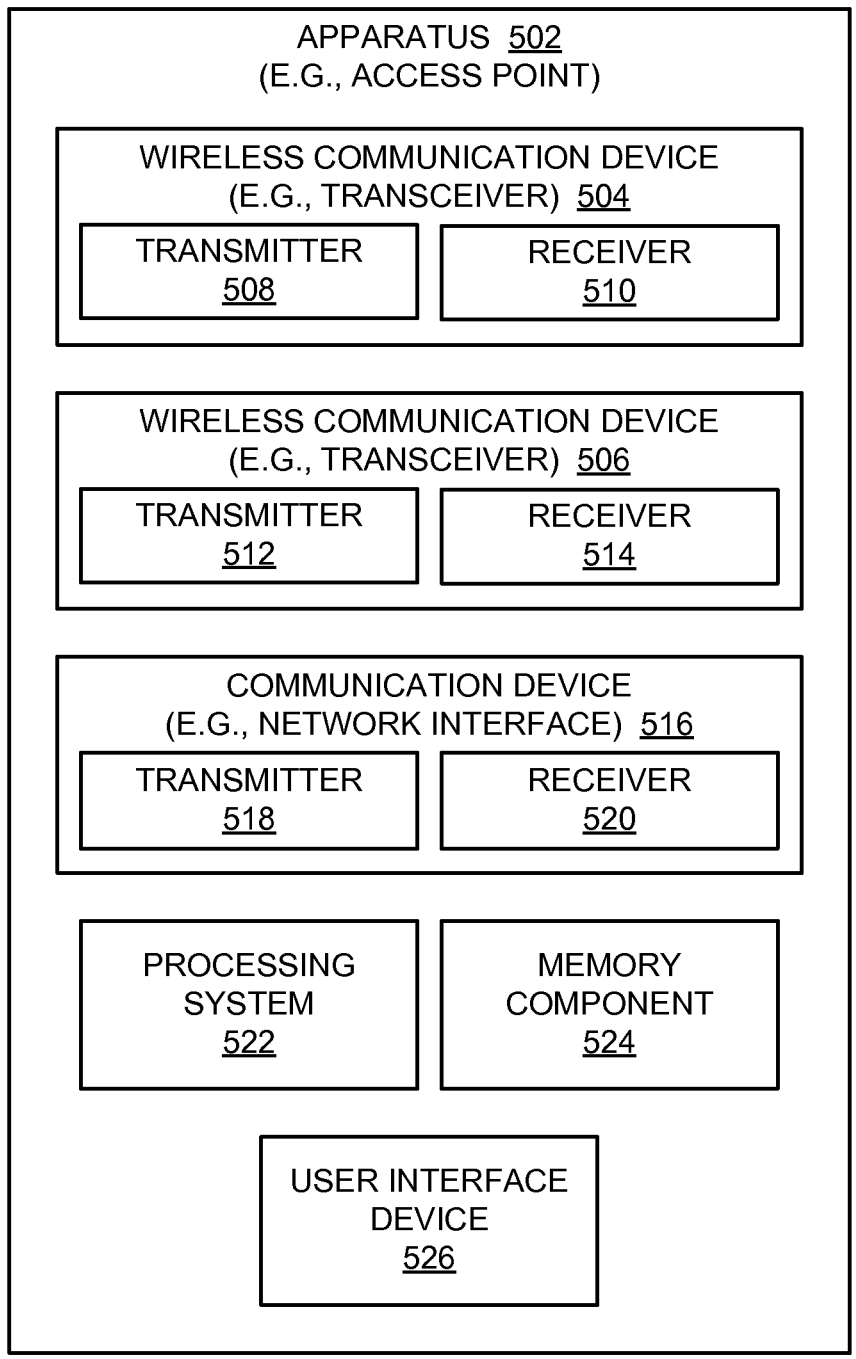
FIG. 5 is a simplified block diagram of several sample aspects of components that may be employed in a communication apparatus.

FIG. 5 illustrates several sample components (represented by corresponding blocks) that may be incorporated into an apparatus 502 (e.g., corresponding to the access point 108 of FIG. 1) to perform multi-mode operations as taught herein. It should be appreciated that these components may be implemented in different types of apparatuses in different implementations (e.g., in an ASIC, in a system on a chip (SoC), etc.). The described components also may be incorporated into other nodes in a communication system. For example, other nodes in a system may include components similar to those described for the apparatus 502 to provide similar functionality. Also, a given node may contain one or more of the described components.

As shown in FIG. 5, the apparatus 502 includes a plurality of wireless communication devices (e.g., transceivers) for communicating with other nodes (e.g., access terminals) via different radio access technologies. In the example of FIG. 5, the apparatus 502 is depicted as including two wireless communication devices 504 and 506. It should be appreciated, however, that different numbers of wireless communication devices (e.g., three, four, or more) may be deployed in different embodiments. Also, a given communication device may comprise one transceiver or more than one transceiver (e.g., for communicating on different carrier frequencies). The wireless communication device 504 includes at least one transmitter 508 for sending signals (e.g., messages, information) and at least one receiver 510 for receiving signals (e.g., messages, information). Similarly, the wireless communication device 506 includes at least one transmitter 512 for sending signals (e.g., messages, information) and at least one receiver 514 for receiving signals (e.g., messages, information). In some embodiments, a wireless communication device (e.g., one of multiple wireless communication devices of the apparatus 502) comprises a network listen module.

The apparatus 502 includes at least one communication device 516 (e.g., a network interface) for communicating with other nodes (e.g., network entities). For example, the communication device 516 may be configured to communicate with one or more network entities via a wire-based or wireless backhaul. In some aspects, the communication device 516 may be implemented as a transceiver (e.g., including transmitter and receiver components) configured to support wire-based or wireless signal communication. This communication may involve, for example, sending and receiving: messages, parameters, other types of information, and so on. Accordingly, in the example of FIG. 5, the communication device 516 is shown as including a transmitter 518 and a receiver 520.

The apparatus 502 also includes other components that may be used in conjunction with multi-mode operations as taught herein. For example, the apparatus 502 includes a processing system 522 for providing functionality relating to controlling multi-mode operations (e.g., determining indications indicative of traffic conditions, determining to switch to another RAT, identifying service requested by an access terminal, invoking communication using another type of RAT, and so on) and for providing other processing functionality. The apparatus 502 includes a memory component 524 (e.g., including a memory device) for maintaining information (e.g., traffic information, thresholds, parameters, and so on). In addition, the apparatus 502 includes a user interface device 526 for providing indications (e.g., audible and/or visual indications) to a user and/or for receiving user input (e.g., upon user actuation of a sensing device such a keypad, a touch screen, a microphone, and so on).

For convenience the apparatus 502 is shown in FIG. 5 as including components that may be used in the various examples described herein. In practice, the illustrated blocks may have different functionality in different implementations. For example, in some implementations, the functionality of the block 522 may be different in an embodiment where redirection of an access terminal involves revoking an IP address as compared to an embodiment where redirection of an access terminal involves temporarily disabling an SSID.

The components of FIG. 5 may be implemented in various ways. In some implementations the components of FIG. 5 may be implemented in one or more circuits such as, for example, one or more processors and/or one or more ASICs (which may include one or more processors). Here, each circuit (e.g., processor) may use and/or incorporate data memory for storing information or executable code used by the circuit to provide this functionality. For example, some or all of the functionality represented by blocks 504, 506, 516, 522, 524, and 526 may be implemented by a processor or processors of an apparatus and data memory of the apparatus (e.g., by execution of appropriate code and/or by appropriate configuration of processor components).

Figure 6:
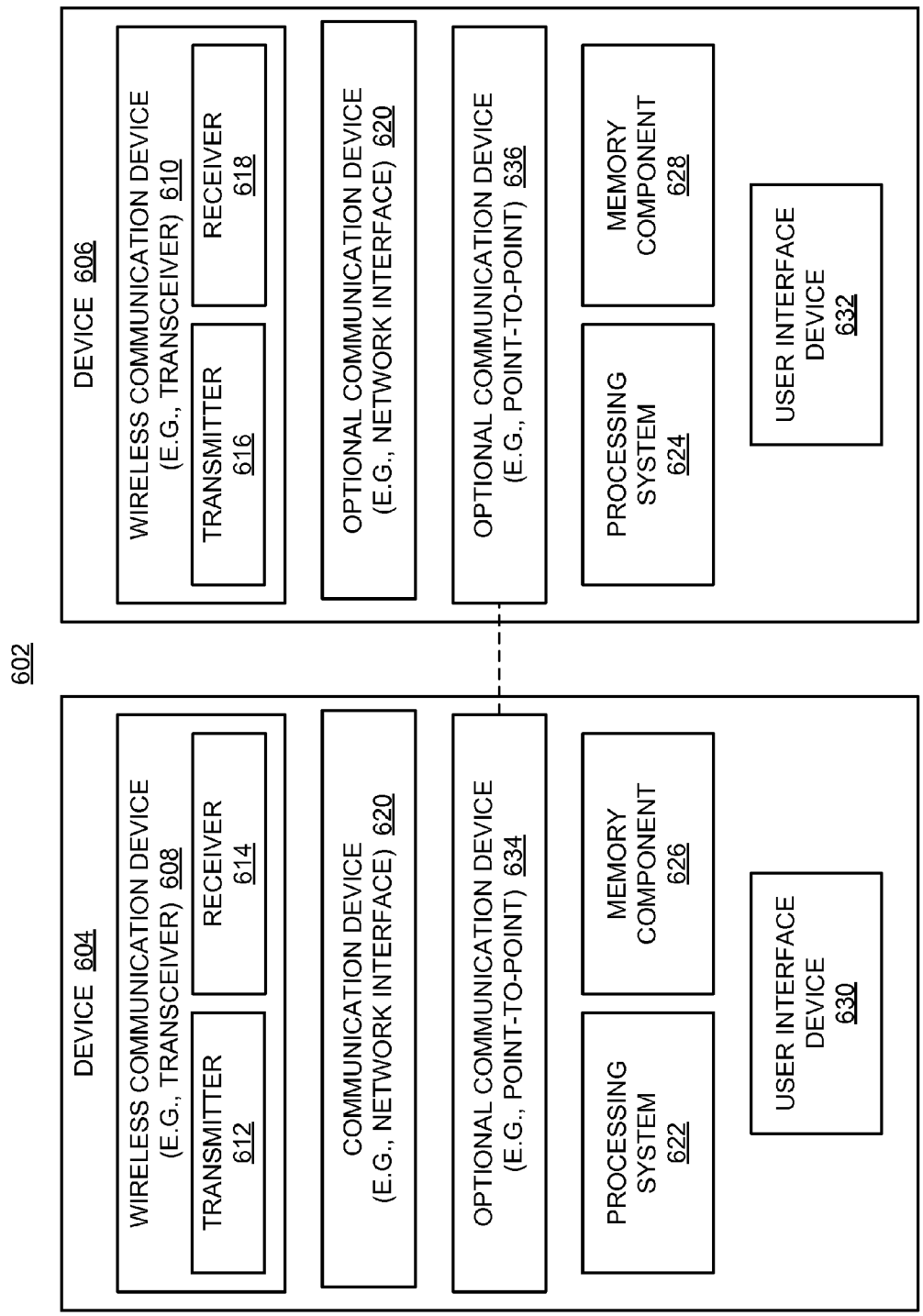
FIG. 6 is a simplified block diagram of several sample aspects of components that may be employed in a multi-mode access point.

As mentioned above, in some embodiments, an access point comprises a plurality of co-located components that are not implemented in a common (i.e., the same) device. FIG. 6 illustrates several sample components (represented by corresponding blocks) that may be incorporated into an access point 602 (e.g., corresponding to the access point 108 of FIG. 1) that employs multiple devices (e.g., embodied in different housings). It should be appreciated, that these components may be implemented in different types of apparatuses in different implementations (e.g., in different ASICs, in different SoCs, etc.). The described components also may be incorporated into other nodes in a communication system. Also, a given node may contain one or more of the described components.

As shown in FIG. 6, the access point 602 includes a plurality of devices. In this example, the access point 602 is depicted as including two devices 604 and 606. It should be appreciated, however, that different numbers of devices (e.g., three, four, or more) may be deployed in different embodiments.

Each of the devices 604 and 606 includes at least one wireless communication device (e.g., transceiver) for communicating with other nodes via a designated radio access technology. In the example of FIG. 6, the device 604 includes a wireless communication device 608 and the device 606 includes a wireless communication device 610. Thus, the access point 602 includes two wireless communication devices in this example. It should be appreciated, however, that different numbers of wireless communication devices (e.g., three, four, or more) may be deployed in different embodiments.

In a typical implementation, the different devices 604 and 606 include components (e.g., base stations) for different types of RATs. For example, in a sample implementation, the wireless communication device 608 comprises a femto-cell and the wireless communication device 610 comprises a Wi-Fi base station.

A given wireless communication device may comprise one transceiver or more than one transceiver (e.g., for communicating on different carrier frequencies). The wireless communication device 608 includes at least one transmitter 612 for sending signals (e.g., messages, information) and at least one receiver 614 for receiving signals (e.g., messages, information). Similarly, the wireless communication device 610 includes at least one transmitter 616 for sending signals (e.g., messages, information) and at least one receiver 618 for receiving signals (e.g., messages, information). As discussed above, in some implementations, a wireless communication device comprises a network listen module.

The access point 602 includes at least one communication device 620 (e.g., a network interface) for communicating with other nodes (e.g., network entities). In some implementations, the access point 602 includes a single communication device 620 (e.g., in the device 604). In this case, the access point may use a single backhaul link to communicate with a WAN (e.g., via a core network). In other implementations, the access point 602 includes multiple communication devices 620 (e.g., one each in the devices 604 and 606). In this case, the access point may use multiple backhaul links to communicate with a WAN.

The communication device 620 may be configured to communicate with one or more network entities via a wire-based or wireless backhaul. In some aspects, the communication device 620 may be implemented as a transceiver (e.g., including transmitter and receiver components) configured to support wire-based or wireless signal communication as discussed above in conjunction with FIG. 5.

The devices 604 and 606 may include communication devices 634 and 636, respectively, for providing point-to-point communication. For example, the communication devices may provide interfaces to a local bus (e.g., USB) over which the devices communicate (e.g., to coordinate a switch between RATs).

The devices 604 and 606 also include other components that may be used in conjunction with multi-mode operations as taught herein. For example, the device 604 includes a processing system 622 for providing functionality relating to controlling multi-mode operations (e.g., as discussed above in conjunction with FIG. 5), supporting the corresponding RAT for the device 604, and providing other processing functionality. The device 606 also includes a processing system 624 for providing functionality relating to controlling multi-mode operations (e.g., as discussed above in conjunction with FIG. 5), supporting the corresponding RAT for the device 606, and providing other processing functionality. The devices 604 and 606 include memory components 626 and 628 (e.g., including a memory device), respectively, for maintaining information (e.g., traffic information, thresholds, parameters, and so on). In addition, the devices 604 and 606 include user interface devices 630 and 632, respectively, for providing indications (e.g., audible and/or visual indications) to a user and/or for receiving user input (e.g., upon user actuation of a sensing device such a keypad, a touch screen, a microphone, and so on).

The components of FIG. 6 may be implemented in various ways. In some implementations the components of FIG. 6 may be implemented in one or more circuits such as, for example, one or more processors and/or one or more ASICs (which may include one or more processors). Here, each circuit (e.g., processor) may use and/or incorporate data memory for storing information or executable code used by the circuit to provide this functionality. For example, some or all of the functionality represented for a given device may be implemented by a processor or processors of the device and data memory of the device (e.g., by execution of appropriate code and/or by appropriate configuration of processor components).

As discussed above, in some aspects the teachings herein may be employed in a network that includes macro scale coverage (e.g., a large area cellular network such as a 3G network, typically referred to as a macro cell network or a WAN) and smaller scale coverage (e.g., a residence-based or building-based network environment, typically referred to as a LAN). As an access terminal (AT) moves through such a network, the access terminal may be served in certain locations by access points that provide macro coverage while the access terminal may be served at other locations by access points that provide smaller scale coverage. In some aspects, the smaller coverage nodes may be used to provide incremental capacity growth, in-building coverage, and different services (e.g., for a more robust user experience).

In the description herein, a node (e.g., an access point) that provides coverage over a relatively large area may be referred to as a macro access point while a node that provides coverage over a relatively small area (e.g., a residence) may be referred to as a femto access point. It should be appreciated that the teachings herein may be applicable to nodes associated with other types of coverage areas. For example, a pico access point may provide coverage (e.g., coverage within a commercial building) over an area that is smaller than a macro area and larger than a femto area. In various applications, other terminology may be used to reference a macro access point, a femto access point, or other access point-type nodes. For example, a macro access point may be configured or referred to as an access node, base station, access point, eNodeB, macro cell, and so on. Also, a femto access point may be configured or referred to as a Home NodeB, Home eNodeB, access point base station, femto cell, and so on. In some implementations, a node may be associated with (e.g., referred to as or divided into) one or more cells or sectors. A cell or sector associated with a macro access point, a femto access point, or a pico access point may be referred to as a macro cell, a femto cell, or a pico cell, respectively.

Figure 7:
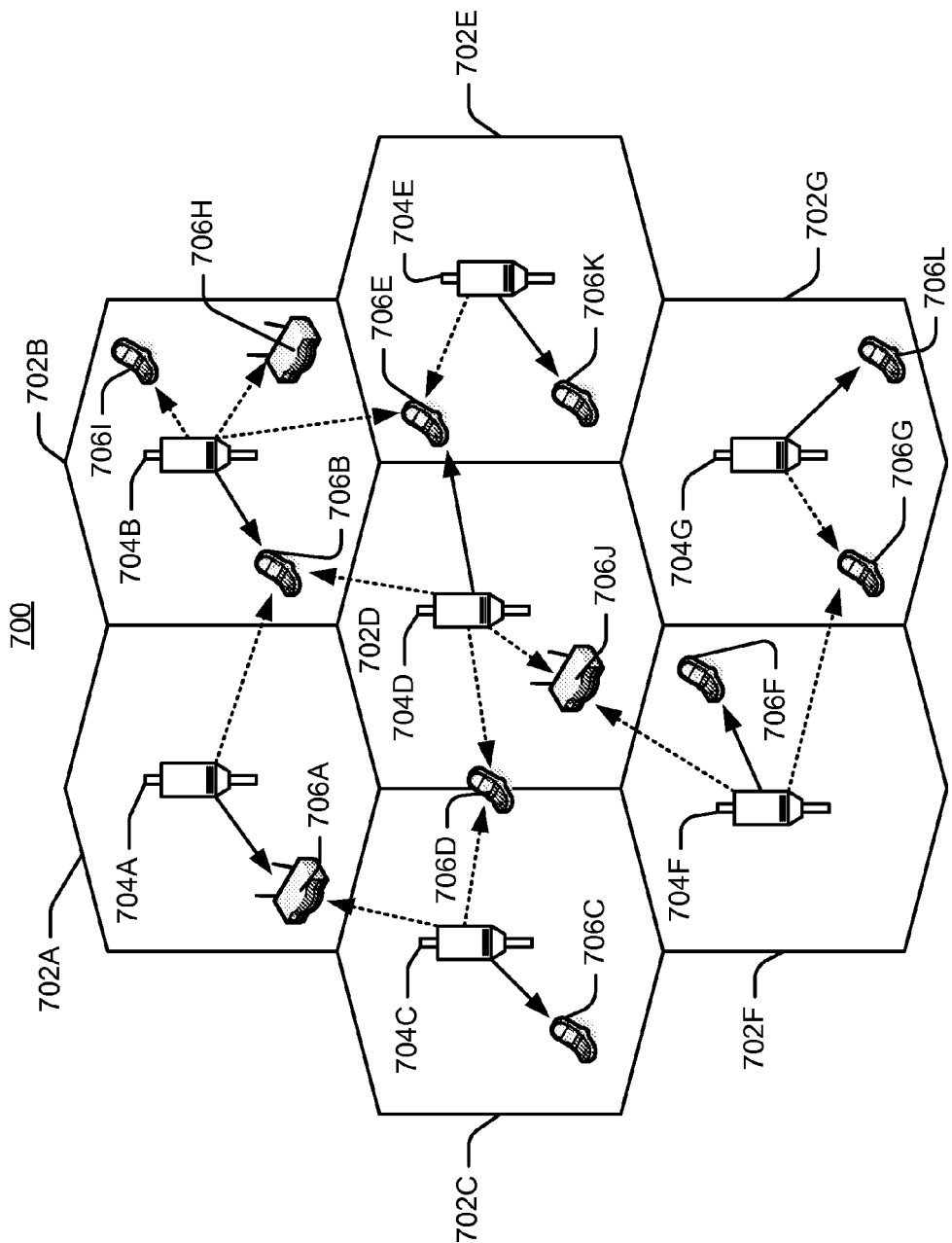
FIG. 7 is a simplified diagram of a wireless communication system.

FIG. 7 illustrates a wireless communication system 700, configured to support a number of users, in which the teachings herein may be implemented. The system 700 provides communication for multiple cells 702, such as, for example, macro cells 702A-702G, with each cell being serviced by a corresponding access point 704 (e.g., access points 704A-704G). As shown in FIG. 7, access terminals 706 (e.g., access terminals 706A-706L) may be dispersed at various locations throughout the system over time. Each access terminal 706 may communicate with one or more access points 704 on a forward link (FL) and/or a reverse link (RL) at a given moment, depending upon whether the access terminal 706 is active and whether it is in soft handoff, for example. The wireless communication system 700 may provide service over a large geographic region. For example, macro cells 702A-702G may cover a few blocks in a neighborhood or several miles in a rural environment.

Figure 8:
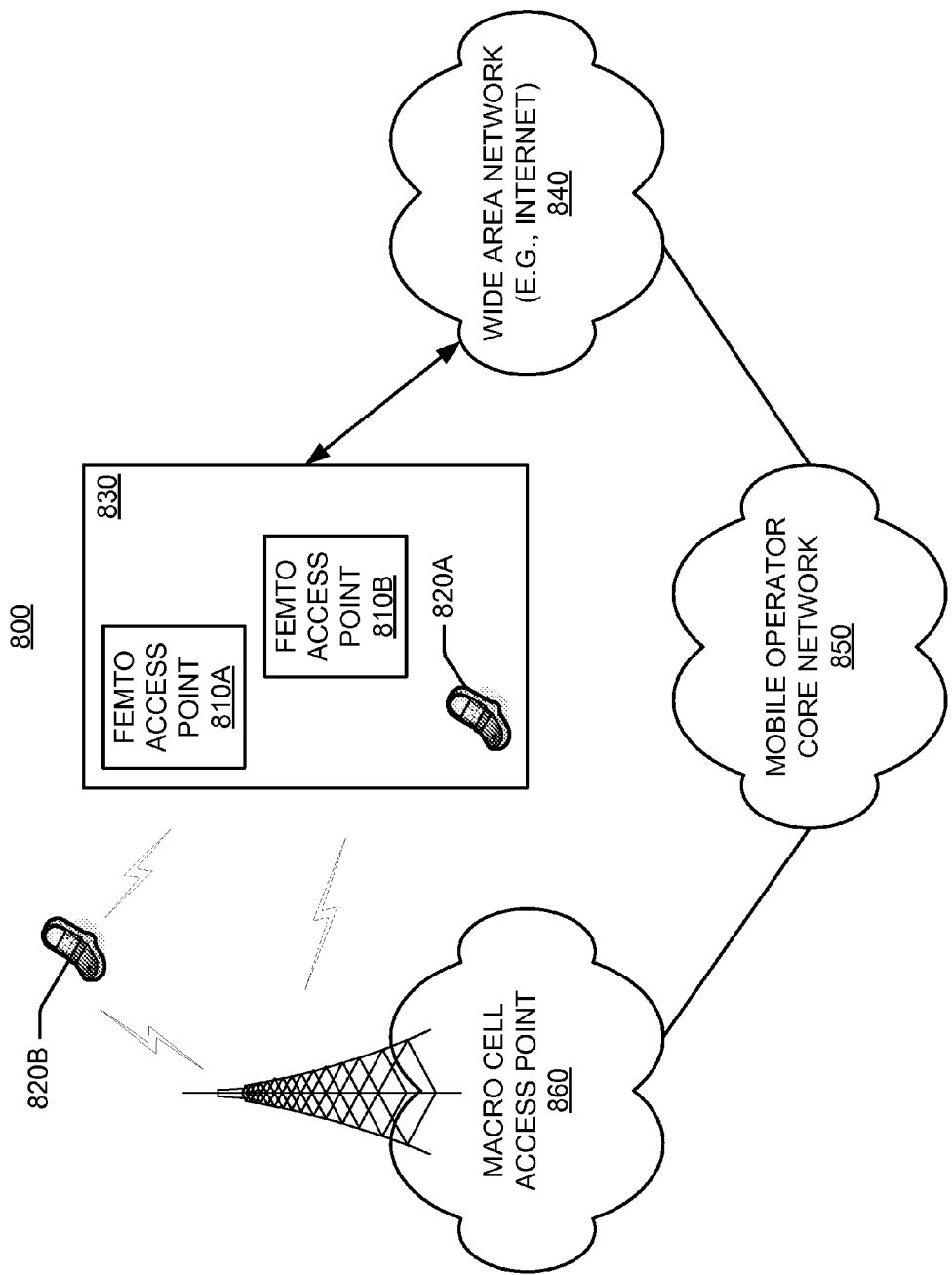
FIG. 8 is a simplified diagram of a wireless communication system including femto nodes.

FIG. 8 illustrates an exemplary communication system 800 where one or more femto access points are deployed within a network environment. Specifically, the system 800 includes multiple femto access points 810 (e.g., femto access points 810A and 810B) installed in a relatively small scale network environment (e.g., in one or more user residences 830). Each femto access point 810 may be coupled to a wide area network 840 (e.g., the Internet) and a mobile operator core network 850 via a DSL router, a cable modem, a wireless link, or other connectivity means (not shown). As will be discussed below, each femto access point 810 may be configured to serve associated access terminals 820 (e.g., access terminal 820A) and, optionally, other (e.g., hybrid or alien) access terminals 820 (e.g., access terminal 820B). In other words, access to femto access points 810 may be restricted whereby a given access terminal 820 may be served by a set of designated (e.g., home) femto access point(s) 810 but may not be served by any non-designated femto access points 810 (e.g., a neighbor's femto access point 810).

Figure 9:
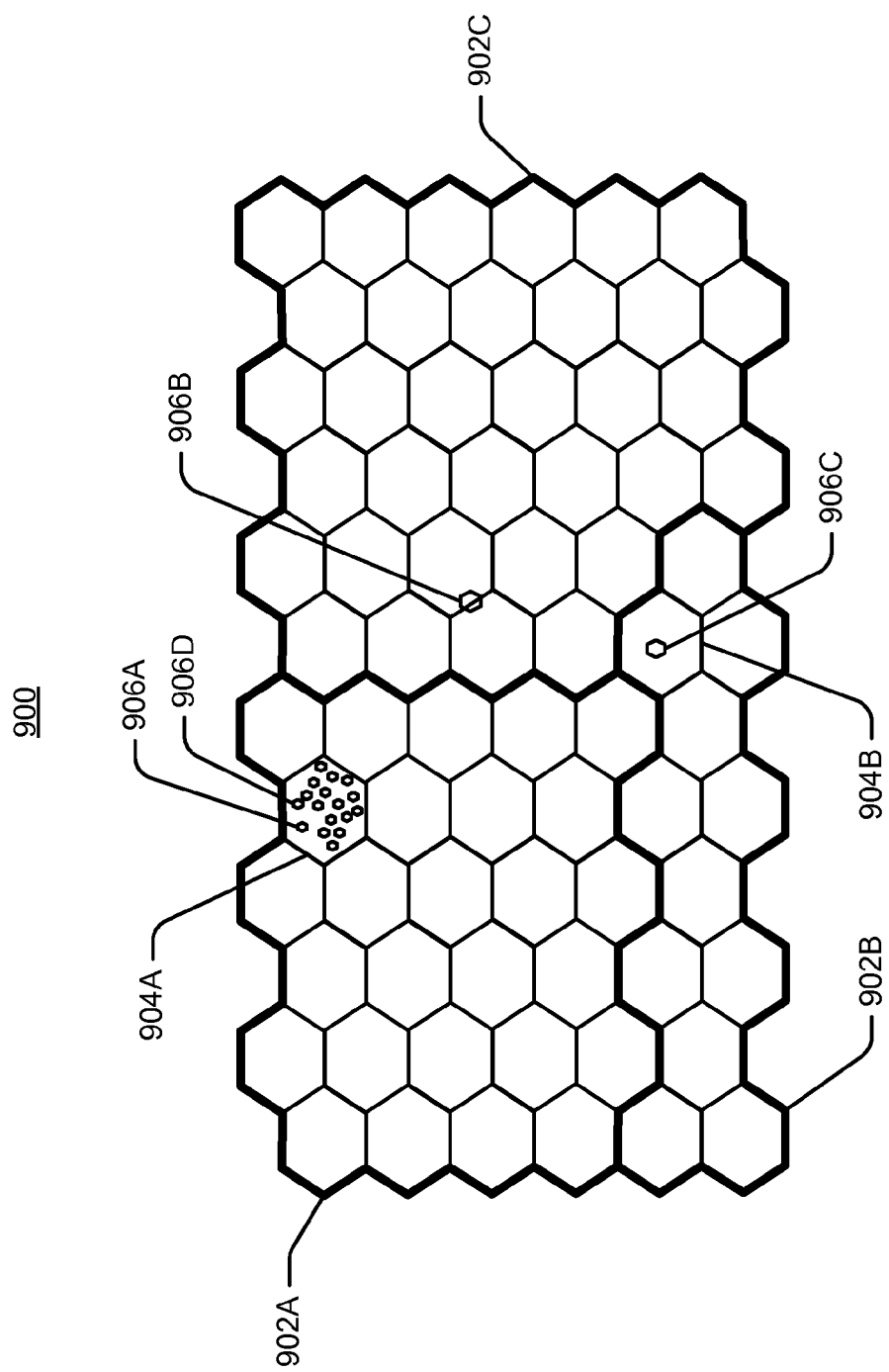
FIG. 9 is a simplified diagram illustrating coverage areas for wireless communication.

FIG. 9 illustrates an example of a coverage map 900 where several tracking areas 902 (or routing areas or location areas) are defined, each of which includes several macro coverage areas 904. Here, areas of coverage associated with tracking areas 902A, 902B, and 902C are delineated by the wide lines and the macro coverage areas 904 are represented by the larger hexagons. The tracking areas 902 also include femto coverage areas 906. In this example, each of the femto coverage areas 906 (e.g., femto coverage areas 906B and 906C) is depicted within one or more macro coverage areas 904 (e.g., macro coverage areas 904A and 904B). It should be appreciated, however, that some or all of a femto coverage area 906 may not lie within a macro coverage area 904. In practice, a large number of femto coverage areas 906 (e.g., femto coverage areas 906A and 906D) may be defined within a given tracking area 902 or macro coverage area 904. Also, one or more pico coverage areas (not shown) may be defined within a given tracking area 902 or macro coverage area 904.

Referring again to FIG. 8, the owner of a femto access point 810 may subscribe to mobile service, such as, for example, 3G mobile service, offered through the mobile operator core network 850. In addition, an access terminal 820 may be capable of operating both in macro environments and in smaller scale (e.g., residential) network environments. In other words, depending on the current location of the access terminal 820, the access terminal 820 may be served by a macro cell access point 860 associated with the mobile operator core network 850 or by any one of a set of femto access points 810 (e.g., the femto access points 810A and 810B that reside within a corresponding user residence 830). For example, when a subscriber is outside his home, he is served by a standard macro access point (e.g., access point 860) and when the subscriber is at home, he is served by a femto access point (e.g., access point 810A). Here, a femto access point 810 may be backward compatible with legacy access terminals 820.

A femto access point 810 may be deployed on a single frequency or, in the alternative, on multiple frequencies. Depending on the particular configuration, the single frequency or one or more of the multiple frequencies may overlap with one or more frequencies used by a macro access point (e.g., access point 860).

In some aspects, an access terminal 820 may be configured to connect to a preferred femto access point (e.g., the home femto access point of the access terminal 820) whenever such connectivity is possible. For example, whenever the access terminal 820A is within the user's residence 830, it may be desired that the access terminal 820A communicate only with the home femto access point 810A or 810B.

In some aspects, if the access terminal 820 operates within the macro cellular network 850 but is not residing on its most preferred network (e.g., as defined in a preferred roaming list), the access terminal 820 may continue to search for the most preferred network (e.g., the preferred femto access point 810) using a better system reselection (BSR) procedure, which may involve a periodic scanning of available systems to determine whether better systems are currently available and subsequently acquire such preferred systems. The access terminal 820 may limit the search for specific band and channel. For example, one or more femto channels may be defined whereby all femto access points (or all restricted femto access points) in a region operate on the femto channel(s). The search for the most preferred system may be repeated periodically. Upon discovery of a preferred femto access point 810, the access terminal 820 selects the femto access point 810 and registers on it for use when within its coverage area.

Access to a femto access point may be restricted in some aspects. For example, a given femto access point may only provide certain services to certain access terminals. In deployments with so-called restricted (or closed) access, a given access terminal may only be served by the macro cell mobile network and a defined set of femto access points (e.g., the femto access points 810 that reside within the corresponding user residence 830). In some implementations, an access point may be restricted to not provide, for at least one node (e.g., access terminal), at least one of: signaling, data access, registration, paging, or service.

In some aspects, a restricted femto access point (which may also be referred to as a Closed Subscriber Group Home NodeB) is one that provides service to a restricted provisioned set of access terminals. This set may be temporarily or permanently extended as necessary. In some aspects, a Closed Subscriber Group (CSG) may be defined as the set of access points (e.g., femto access points) that share a common access control list of access terminals.

Various relationships may thus exist between a given femto access point and a given access terminal For example, from the perspective of an access terminal, an open femto access point may refer to a femto access point with unrestricted access (e.g., the femto access point allows access to any access terminal). A restricted femto access point may refer to a femto access point that is restricted in some manner (e.g., restricted for access and/or registration). A home femto access point may refer to a femto access point on which the access terminal is authorized to access and operate on (e.g., permanent access is provided for a defined set of one or more access terminals). A hybrid (or guest) femto access point may refer to a femto access point on which different access terminals are provided different levels of service (e.g., some access terminals may be allowed partial and/or temporary access while other access terminals may be allowed full access). An alien femto access point may refer to a femto access point on which the access terminal is not authorized to access or operate on, except for perhaps emergency situations (e.g., 911 calls).

From a restricted femto access point perspective, a home access terminal may refer to an access terminal that is authorized to access the restricted femto access point installed in the residence of that access terminal's owner (usually the home access terminal has permanent access to that femto access point). A guest access terminal may refer to an access terminal with temporary access to the restricted femto access point (e.g., limited based on deadline, time of use, bytes, connection count, or some other criterion or criteria). An alien access terminal may refer to an access terminal that does not have permission to access the restricted femto access point, except for perhaps emergency situations, for example, such as 911 calls (e.g., an access terminal that does not have the credentials or permission to register with the restricted femto access point).

For convenience, the disclosure herein describes various functionality in the context of a femto access point. It should be appreciated, however, that a pico access point may provide the same or similar functionality for a larger coverage area. For example, a pico access point may be restricted, a home pico access point may be defined for a given access terminal, and so on.

The teachings herein may be employed in a wireless multiple-access communication system that simultaneously supports communication for multiple wireless access terminals. Here, each terminal may communicate with one or more access points via transmissions on the forward and reverse links. The forward link (or downlink) refers to the communication link from the access points to the terminals, and the reverse link (or uplink) refers to the communication link from the terminals to the access points. This communication link may be established via a single-in-single-out system, a multiple-in-multiple-out (MIMO) system, or some other type of system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system may provide improved performance (e.g., higher throughput and/or greater reliability) if the additional dimensionalities created by the multiple transmit and receive antennas are utilized.

A MIMO system may support time division duplex (TDD) and frequency division duplex (FDD). In a TDD system, the forward and reverse link transmissions are on the same frequency region so that the reciprocity principle allows the estimation of the forward link channel from the reverse link channel. This enables the access point to extract transmit beam-forming gain on the forward link when multiple antennas are available at the access point.

Figure 10:
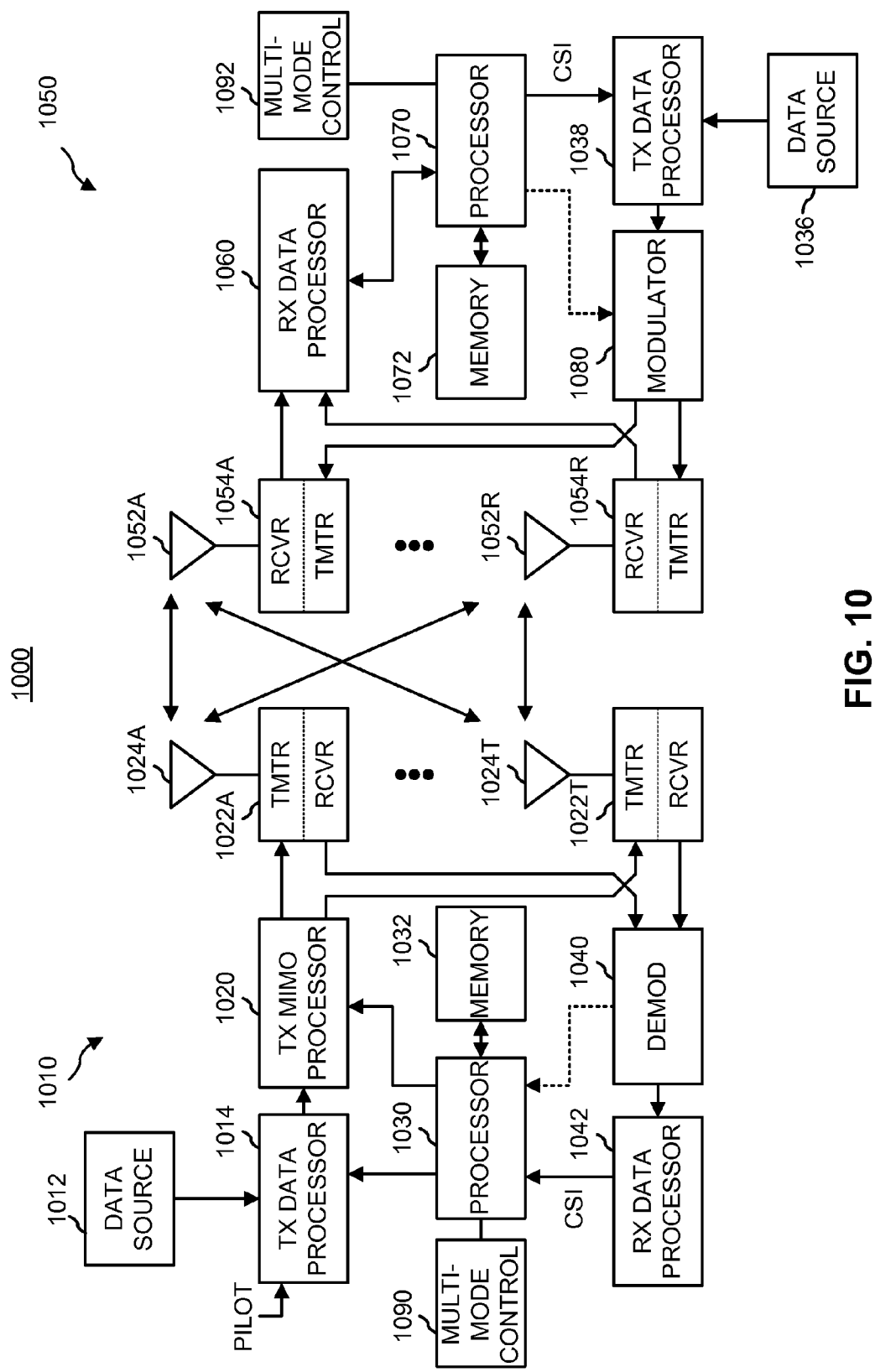
FIG. 10 is a simplified block diagram of several sample aspects of communication components.

FIG. 10 illustrates a wireless device 1010 (e.g., an access point) and a wireless device 1050 (e.g., an access terminal) of a sample MIMO system 1000. At the device 1010, traffic data for a number of data streams is provided from a data source 1012 to a transmit (TX) data processor 1014. Each data stream may then be transmitted over a respective transmit antenna.

The TX data processor 1014 formats, codes, and interleaves the traffic data for each data stream based on a particular coding scheme selected for that data stream to provide coded data. The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 1030. A data memory 1032 may store program code, data, and other information used by the processor 1030 or other components of the device 1010.

The modulation symbols for all data streams are then provided to a TX MIMO processor 1020, which may further process the modulation symbols (e.g., for OFDM). The TX MIMO processor 1020 then provides $N_T$ modulation symbol streams to $N_T$ transceivers (XCVR) 1022A through 1022T. In some aspects, the TX MIMO processor 1020 applies beam-forming weights to the symbols of the data streams and to the antenna from which the symbol is being transmitted.

Each transceiver 1022 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers 1022A through 1022T are then transmitted from $N_T$ antennas 1024A through 1024T, respectively.

At the device 1050, the transmitted modulated signals are received by $N_R$ antennas 1052A through 1052R and the received signal from each antenna 1052 is provided to a respective transceiver (XCVR) 1054A through 1054R. Each transceiver 1054 conditions (e.g., filters, amplifies, and downconverts) a respective received signal, digitizes the conditioned signal to provide samples, and further processes the samples to provide a corresponding "received" symbol stream.

A receive (RX) data processor 1060 then receives and processes the $N_R$ received symbol streams from $N_R$ transceivers 1054 based on a particular receiver processing technique to provide $N_T$ "detected" symbol streams. The RX data processor 1060 then demodulates, deinterleaves, and decodes each detected symbol stream to recover the traffic data for the data stream. The processing by the RX data processor 1060 is complementary to that performed by the TX MIMO processor 1020 and the TX data processor 1014 at the device 1010.

A processor 1070 periodically determines which precoding matrix to use (discussed below). The processor 1070 formulates a reverse link message comprising a matrix index portion and a rank value portion. A data memory 1072 may store program code, data, and other information used by the processor 1070 or other components of the device 1050.

The reverse link message may comprise various types of information regarding the communication link and/or the received data stream. The reverse link message is then processed by a TX data processor 1038, which also receives traffic data for a number of data streams from a data source 1036, modulated by a modulator 1080, conditioned by the transceivers 1054A through 1054R, and transmitted back to the device 1010.

At the device 1010, the modulated signals from the device 1050 are received by the antennas 1024, conditioned by the transceivers 1022, demodulated by a demodulator (DEMOD) 1040, and processed by a RX data processor 1042 to extract the reverse link message transmitted by the device 1050. The processor 1030 then determines which pre-coding matrix to use for determining the beam-forming weights then processes the extracted message.

FIG. 10 also illustrates that the communication components may include one or more components that perform multi-mode control operations as taught herein. For example, a multi-mode control component 1090 may cooperate with the processor 1030 and/or other components of the device 1010 to switch between wireless access modes as taught herein. Similarly, a multi-mode control component 1092 may cooperate with the processor 1070 and/or other components of the device 1050 to switch between wireless access modes. It should be appreciated that for each device 1010 and 1050 the functionality of two or more of the described components may be provided by a single component. For example, a single processing component may provide the functionality of the multi-mode control component 1090 and the processor 1030 and a single processing component may provide the functionality of the multi-mode control component 1092 and the processor 1070.

The teachings herein may be incorporated into various types of communication systems and/or system components. In some aspects, the teachings herein may be employed in a multiple-access system capable of supporting communication with multiple users by sharing the available system resources (e.g., by specifying one or more of bandwidth, transmit power, coding, interleaving, and so on). For example, the teachings herein may be applied to any one or combinations of the following technologies: Code Division Multiple Access (CDMA) systems, Multiple-Carrier CDMA (MCCDMA), Wideband CDMA (W-CDMA), High-Speed Packet Access (HSPA, HSPA+) systems, Time Division Multiple Access (TDMA) systems, Frequency Division Multiple Access (FDMA) systems, Single-Carrier FDMA (SC-FDMA) systems, Orthogonal Frequency Division Multiple Access (OFDMA) systems, or other multiple access techniques. A wireless communication system employing the teachings herein may be designed to implement one or more standards, such as IS-95, cdma2000, IS-856, W-CDMA, TDSCDMA, and other standards. A CDMA network may implement a radio technology such as Universal Terrestrial Radio Access (UTRA), cdma2000, or some other technology. UTRA includes W-CDMA and Low Chip Rate (LCR). The cdma2000 technology covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). The teachings herein may be implemented in a 3GPP Long Term Evolution (LTE) system, an Ultra-Mobile Broadband (UMB) system, and other types of systems. LTE is a release of UMTS that uses E-UTRA. UTRA, E-UTRA, GSM, UMTS and LTE are described in documents from an organization named "3rd Generation Partnership Project" (3GPP), while cdma2000 is described in documents from an organization named "3rd Generation Partnership Project 2" (3GPP2). Although certain aspects of the disclosure may be described using 3GPP terminology, it is to be understood that the teachings herein may be applied to 3GPP (e.g., Rel99, Rel5, Rel6, Rel7) technology, as well as 3GPP2 (e.g., 1xRTT, 1xEV-DO Rel0, RevA, RevB) technology and other technologies.

The teachings herein may be incorporated into (e.g., implemented within or performed by) a variety of apparatuses (e.g., nodes). In some aspects, a node (e.g., a wireless node) implemented in accordance with the teachings herein may comprise an access point or an access terminal.

For example, an access terminal may comprise, be implemented as, or known as user equipment, a subscriber station, a subscriber unit, a mobile station, a mobile, a mobile node, a remote station, a remote terminal, a user terminal, a user agent, a user device, or some other terminology. In some implementations an access terminal may comprise a cellular telephone, a cordless telephone, a session initiation protocol (SIP) phone, a wireless local loop (WLL) station, a personal digital assistant (PDA), a handheld device having wireless connection capability, or some other suitable processing device connected to a wireless modem. Accordingly, one or more aspects taught herein may be incorporated into a phone (e.g., a cellular phone or smart phone), a personal computer (e.g., a laptop), a portable communication device, a portable computing device (e.g., a personal data assistant), an entertainment device (e.g., a music device, a video device, or a satellite radio), a global positioning system device, or any other suitable device that is configured to communicate via a wireless medium.

An access point may comprise, be implemented as, or known as a NodeB, an eNodeB, a radio network controller (RNC), a base station (BS), a radio base station (RBS), a base station controller (BSC), a base transceiver station (BTS), a transceiver function (TF), a radio transceiver, a radio router, a basic service set (BSS), an extended service set (ESS), a macro cell, a macro node, a Home eNB (HeNB), a femto cell, a femto node, a pico node, or some other similar terminology.

In some aspects a node (e.g., an access point) may comprise an access node for a communication system. Such an access node may provide, for example, connectivity for or to a network (e.g., a wide area network such as the Internet or a cellular network) via a wired or wireless communication link to the network. Accordingly, an access node may enable another node (e.g., an access terminal) to access a network or some other functionality. In addition, it should be appreciated that one or both of the nodes may be portable or, in some cases, relatively non-portable.

Also, it should be appreciated that a wireless node may be capable of transmitting and/or receiving information in a non-wireless manner (e.g., via a wired connection). Thus, a receiver and a transmitter as discussed herein may include appropriate communication interface components (e.g., electrical or optical interface components) to communicate via a non-wireless medium.

A wireless node may communicate via one or more wireless communication links that are based on or otherwise support any suitable RAT. For example, in some aspects a wireless node may associate with a network. In some aspects the network may comprise a local area network or a wide area network. A wireless device may support or otherwise use one or more of a variety of radio access technologies, protocols, or standards such as those discussed herein (e.g., CDMA, TDMA, OFDM, OFDMA, WiMAX, Wi-Fi, and so on). Similarly, a wireless node may support or otherwise use one or more of a variety of corresponding modulation or multiplexing schemes. A wireless node may thus include appropriate components (e.g., air interfaces) to establish and communicate via one or more wireless communication links using the above or other radio access technologies. For example, a wireless node may comprise a wireless transceiver with associated transmitter and receiver components that may include various components (e.g., signal generators and signal processors) that facilitate communication over a wireless medium.

Figure 11:
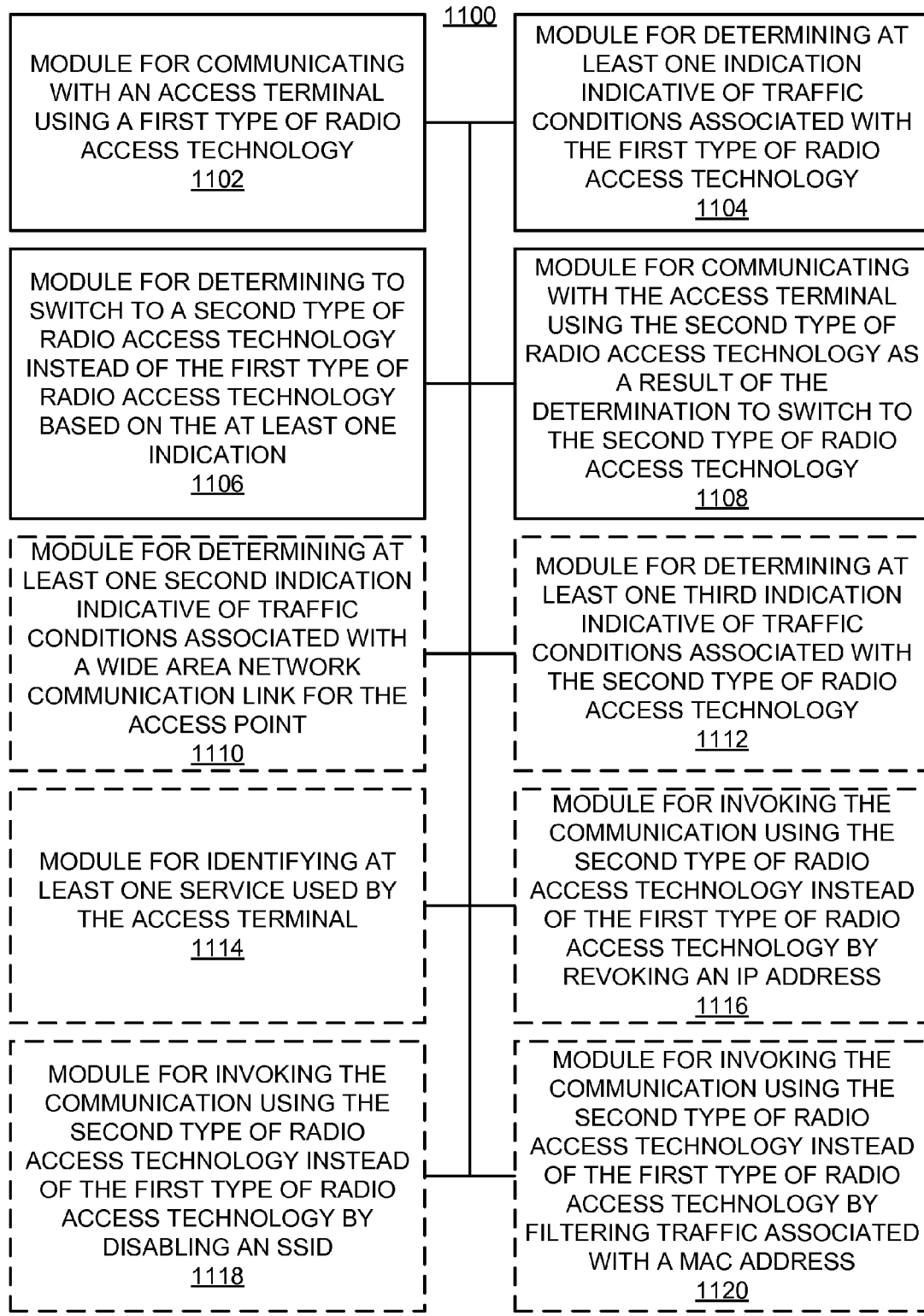
FIG. 11 is a simplified block diagram of several sample aspects of an apparatus configured to support multi-mode communication as taught herein.

The functionality described herein (e.g., with regard to one or more of the accompanying figures) may correspond in some aspects to similarly designated "means for" functionality in the appended claims. Referring to FIG. 11, an apparatus 1100 is represented as a series of interrelated functional modules. Here, a module for communicating with an access terminal using a first type of radio access technology 1102 may correspond at least in some aspects to, for example, a communication device as discussed herein. A module for determining at least one indication indicative of traffic conditions associated with the first type of radio access technology 1104 may correspond at least in some aspects to, for example, a processing system as discussed herein. A module for determining to switch to a second type of radio access technology instead of the first type of radio access technology based on the at least one indication 1106 may correspond at least in some aspects to, for example, a processing system as discussed herein. A module for communicating with the access terminal using the second type of radio access technology as a result of the determination to switch to the second type of radio access technology 1108 may correspond at least in some aspects to, for example, a communication device as discussed herein. A module for determining at least one second indication indicative of traffic conditions associated with a wide area network communication link for the access point 1110 may correspond at least in some aspects to, for example, a processing system as discussed herein. A module for determining at least one third indication indicative of traffic conditions associated with the second type of radio access technology 1112 may correspond at least in some aspects to, for example, a processing system as discussed herein. A module for identifying at least one service used by the access terminal 1114 may correspond at least in some aspects to, for example, a processing system as discussed herein. A module for invoking the communication using the second type of radio access technology instead of the first type of radio access technology by revoking an IP address 1116 may correspond at least in some aspects to, for example, a processing system as discussed herein. A module for invoking the communication using the second type of radio access technology instead of the first type of radio access technology by disabling an SSID 1118 may correspond at least in some aspects to, for example, a processing system as discussed herein. A module for invoking the communication using the second type of radio access technology instead of the first type of radio access technology by filtering traffic associated with a MAC address 1120 may correspond at least in some aspects to, for example, a processing system as discussed herein.

The functionality of the modules of FIG. 11 may be implemented in various ways consistent with the teachings herein. In some aspects the functionality of these modules may be implemented as one or more electrical components. In some aspects the functionality of these blocks may be implemented as a processing system including one or more processor components. In some aspects the functionality of these modules may be implemented using, for example, at least a portion of one or more integrated circuits (e.g., an ASIC). As discussed herein, an integrated circuit may include a processor, software, other related components, or some combination thereof Thus, the functionality of different modules may be implemented, for example, as different subsets of an integrated circuit, as different subsets of a set of software modules, or a combination thereof Also, it should be appreciated that a given subset (e.g., of an integrated circuit and/or of a set of software modules) may provide at least a portion of the functionality for more than one module. The functionality of these modules also may be implemented in some other manner as taught herein. In some aspects one or more of any dashed blocks in FIG. 11 are optional.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by a processing system, an integrated circuit ("IC"), an access terminal, or an access point. A processing system may be implemented using one or more ICs or may be implemented within an IC (e.g., as part of a system on a chip). An IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In one or more exemplary embodiments, the functions described may be implemented in hardware, software (e.g., which may be referred to as software, middleware, firmware, etc., depending on how the codes are deployed), or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media. It should be appreciated that a computer-readable medium may be implemented in any suitable computer-program product.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed herein.

What is claimed is:

1. An access point for wireless communication, comprising:
    a first communication component configured to provide service to an access terminal connected to the access point in a coverage area associated with the access point using at least a first transceiver that supports a radio access technology having a first type;
    a processing system configured to determine, at the access point, at least one indication indicative of traffic conditions associated with the radio access technology having the first type based on one or more network attributes that are visible to the access point without explicit support from the connected access terminal, to switch, at the access point, the radio access technology that the access point uses to provide the service to the connected access terminal to a second type instead of the first type based on the at least one indication, and to send a message to the connected access terminal via the radio access technology having the first type, the message configured to cause the connected access terminal to disable communication via the radio access technology having the first type and to enable communication via the radio access technology having the second type; and
    a second communication component configured to provide the service to the access terminal connected to the access point in the coverage area associated with the access point using at least a second transceiver that supports the radio access technology having the second type as a result of the switch in the radio access technology that the access point uses to provide the service to the connected access terminal, wherein the access point corresponds to one node on a wireless network.

2. The access point of claim 1, wherein:
    the first type of radio access technology comprises Wi-Fi technology; and
    the second type of radio access technology comprises cellular technology.

3. The access point of claim 1, wherein the at least one indication is indicative of whether a communication channel established between the access point and the access terminal using the first type of radio access technology is congested.

4. The access point of claim 1, wherein:
    the processing system is further configured to determine at least one second indication indicative of traffic conditions associated with a wide area network communication link for the access point; and the switch to the second type of radio access technology is further based on the at least one second indication.

5. The access point of claim 4, wherein:
the wide area network communication link comprises at least one backhaul link for the access point; and
the at least one second indication indicates whether the at least one backhaul link is a bottleneck for communications served by the access point.

6. The access point of claim 5, wherein, if the at least one backhaul link is the bottleneck for the communications served by the access point, the access terminal is redirected to another access point having at least one different backhaul.

7. The access point of claim 4, wherein:
the processing system is further configured to determine at least one third indication indicative of traffic conditions associated with the second type of radio access technology; and
the switch to the second type of radio access technology is further based on the at least one third indication.

8. The access point of claim 1, wherein:
the processing system is further configured to identify the service that the access point provides to the access terminal; and
the switch to the second type of radio access technology is further based on the service that the access point provides to the access terminal.

9. The access point of claim 1, wherein the processing system is further configured to invoke the switch from the first type of radio access technology to the second type of radio access technology by revoking an Internet Protocol (IP) address associated with the access terminal for communication using the first type of radio access technology.

10. The access point of claim 1, wherein the processing system is further configured to invoke the switch from the first type of radio access technology to the second type of radio access technology by disabling a service set identifier (SSID) advertized by the access point for communication using the first type of radio access technology.

11. The access point of claim 10, wherein the disabled SSID is one of a plurality of SSIDs advertized by the access point for the first type of radio access technology.

12. The access point of claim 1, wherein the processing system is further configured to invoke the switch from the first type of radio access technology to the second type of radio access technology by filtering traffic sent via the first type of radio access technology if the traffic is associated with a media access control (MAC) address assigned to the access terminal.

13. The access point of claim 1, wherein the at least one indication comprises at least one of: throughput, interference, a number of active devices, received signal strength indication (RSSI), a quantity of transmitted access messages, link condition, buffer status, or packet loss rate.

14. The access point of claim 1, comprising a single device that implements at least the first communication component, the processing system, and the second communication component.

15. The access point of claim 1, wherein at least the first communication component and the second communication component are implemented in different housings that are co-located.

16. The access point of claim 15, wherein the first communication component and the second communication component have substantially overlapping coverage areas and are further configured to communicate with one another via point-to-point communication.

17. The access point of claim 1, wherein:
the first type of radio access technology comprises cellular technology; and
the second type of radio access technology comprises Wi-Fi technology.

18. The access point of claim 1, wherein the processing system is further configured to allocate an Internet Protocol (IP) address to the access terminal for communication using the first type and the second type of radio access technology to prevent interruption to an IP connection during the switch from the first type of radio access technology to the second type of radio access technology.

19. The access point of claim 1, wherein the processing system is further configured to wait until a communication channel that the connected access terminal uses to communicate with via the radio access technology having the first type is inactive on before initiating the switch to the radio access technology having the second type.

20. The access point of claim 1, wherein the processing system is further configured to invoke the switch to the radio access technology having the second type in response to a determination that that one or more other access terminals connected to the access point do not support the radio access technology having the second type.

21. The access point of claim 5, wherein the processing system is configured to invoke the switch to the radio access technology having the second type in response to a determination that the traffic conditions on the radio access technology having the first type are congested and further that the at least one backhaul link is not the bottleneck for the communications served by the access point.

22. The access point of claim 21, wherein the processing system is further configured redirect the connected access terminal back to the radio access technology having the first type in response to determining that the congested traffic conditions on the radio access technology having the first type have recovered.

23. The access point of claim 1, wherein the one or more network attributes used to determine the at least one indication indicative of the traffic conditions associated with the radio access technology having the first type are further visible to the access point without explicit support from any core network elements.

24. The access point of claim 1, wherein the second communication component is further configured to receive a connection request from the access terminal on a channel associated with the radio access technology having the second type and to establish a new communication with the access terminal in response to the connection request.

25. The access point of claim 1, wherein the processing system is further configured to cause the first communication component to send the message to the connected access terminal via the first transceiver that supports the radio access technology having the first type.

26. The access point of claim 1, wherein the processing system is further configured to determine the at least one indication based on a record of the traffic conditions associated with the radio access technology having the first type over time.

27. A method of communication for a multi-mode access point, comprising:
providing, by the multi-mode access point, service to an access terminal connected to the multi-mode access point in a coverage area associated with the multi-mode access point using at least a first transceiver that supports a radio access technology having a first type;

determining, by the multi-mode access point, at least one indication indicative of traffic conditions associated with the radio access technology having the first type based on one or more network attributes that are visible to the multi-mode access point without explicit support from the connected access terminal;

switching, by the multi-mode access point, the radio access technology that the multi-mode access point uses to provide the service to the connected access terminal to a second type instead of the first type based on the at least one indication;

sending, to the connected access terminal, a message via the radio access technology having the first type, the message configured to cause the connected access terminal to disable communication via the radio access technology having the first type and to enable communication via the radio access technology having the second type; and providing, by the multi-mode access point, the service to the access terminal connected to the multi-mode access point in the coverage area associated with the multi-mode access point using at least a second transceiver that supports the radio access technology having the second type as a result of the multi-mode access point switching the radio access technology used to provide the service to the connected access terminal, wherein the multi-mode access point corresponds to one node on a wireless network.

28. The method of claim 27, wherein:
the first type of radio access technology comprises Wi-Fi technology; and
the second type of radio access technology comprises cellular technology.

29. The method of claim 27, wherein the at least one indication is indicative of whether a communication channel established between the multi-mode access point and the access terminal using the first type of radio access technology is congested.

30. The method of claim 27, further comprising determining at least one second indication indicative of traffic conditions associated with a wide area network communication link for the multi-mode access point, wherein the switching to the second type of radio access technology is further based on the at least one second indication.

31. The method of claim 30, wherein:
the wide area network communication link comprises at least one backhaul link for the multi-mode access point; and
the at least one second indication indicates whether the at least one backhaul link is a bottleneck for communications served by the multi-mode access point.

32. The method of claim 31, wherein, if the at least one backhaul link is the bottleneck for the communications served by the multi-mode access point, the access terminal is redirected to another access point having at least one different backhaul.

33. The method of claim 30, further comprising determining at least one third indication indicative of traffic conditions associated with the second type of radio access technology, wherein the switching to the second type of radio access technology is further based on the at least one third indication.

34. The method of claim 27, further comprising identifying the service that the multi-mode access point provides to the access terminal, wherein the switching to the second type of radio access technology is further based on the service that the multi-mode access point provides to the access terminal.

35. The method of claim 27, further comprising invoking the switch from the first type of radio access technology to the second type of radio access technology by revoking an Internet Protocol (IP) address associated with the access terminal for communication using the first type of radio access technology.

36. The method of claim 27, further comprising invoking the switch from the first type of radio access technology to the second type of radio access technology by disabling a service set identifier (SSID) advertized by the multi-mode access point for communication using the first type of radio access technology.

37. The method of claim 36, wherein the disabled SSID is one of a plurality of SSIDs advertized by the multi-mode access point for the first type of radio access technology.

38. The method of claim 27, further comprising invoking the switch from the first type of radio access technology to the second type of radio access technology by filtering traffic sent via the first type of radio access technology if the traffic is associated with a media access control (MAC) address assigned to the access terminal.

39. The method of claim 27, wherein the at least one indication comprises at least one of: throughput, interference, a number of active devices, received signal strength indication (RSSI), a quantity of transmitted access messages, link condition, buffer status, or packet loss rate.

40. The method of claim 27, wherein the multi-mode access point comprises a single device that implements at least the first transceiver and the second transceiver.

41. The method of claim 27, wherein the multi-mode access point comprises a plurality of co-located devices that include at least a first device housing the first transceiver and a second device housing the second transceiver.

42. The method of claim 41, wherein the plurality of co-located devices have substantially overlapping coverage areas and communicate via point-to-point communication.

43. The method of claim 27, wherein:
the first type of radio access technology comprises cellular technology; and
the second type of radio access technology comprises Wi-Fi technology.

44. An access point for wireless communication, comprising:
means for providing service to an access terminal connected to a multi-mode access point in a coverage area associated with the multi-mode access point using a radio access technology having a first type;
means for determining at least one indication indicative of traffic conditions associated with the radio access technology having the first type based on one or more network attributes that are visible to the multi-mode access point without explicit support from the connected access terminal;
means for switching the radio access technology that the multi-mode access point uses to provide the service to the connected access terminal to a second type instead of the first type based on the at least one indication;
means for sending, to the connected access terminal, a message via the radio access technology having the first type, the message configured to cause the connected access terminal to disable communication via the radio access technology having the first type and to enable communication via the radio access technology having the second type; and means for providing the service the access terminal connected to the multi-mode access point in the coverage area associated with the multi-mode access point using the radio access technology having the second type as a result of the multi-mode access point switching the radio access technology used to provide the service to the connected access terminal, wherein the multi-mode access point corresponds to one node on a wireless network.

45. The access point of claim 44, wherein:
the first type of radio access technology comprises Wi-Fi technology; and
the second type of radio access technology comprises cellular technology.

46. The access point of claim 44, wherein the at least one indication is indicative of whether a communication channel established between the access point and the access terminal using the first type of radio access technology is congested.

47. The access point of claim 44, further comprising means for determining at least one second indication indicative of traffic conditions associated with a wide area network communication link for the access point, wherein the switch to the second type of radio access technology is further based on the at least one second indication.

48. The access point of claim 47, further comprising means for determining at least one third indication indicative of traffic conditions associated with the second type of radio access technology, wherein the switch to the second type of radio access technology is further based on the at least one third indication.

49. The access point of claim 44, further comprising means for identifying the service that the access point provides to the access terminal, wherein the switch to the second type of radio access technology is further based on the service that the access point provides to the access terminal.

50. The access point of claim 44, further comprising means for invoking the switch from the first type of radio access technology to the second type of radio access technology by revoking an Internet Protocol (IP) address associated with the access terminal for communication using the first type of radio access technology.

51. The access point of claim 44, further comprising means for invoking the switch from the first type of radio access technology to the second type of radio access technology by disabling a service set identifier (SSID) advertized by the access point for communication using the first type of radio access technology.

52. The access point of claim 44, further comprising means for invoking the switch from the first type of radio access technology to the second type of radio access technology by filtering traffic sent via the first type of radio access technology if the traffic is associated with a media access control (MAC) address assigned to the access terminal.

53. The access point of claim 44, wherein:
the first type of radio access technology comprises cellular technology; and
the second type of radio access technology comprises Wi-Fi technology.

54. A non-transitory computer-readable medium comprising code for causing a multi-mode access point to:
provide service to an access terminal connected to the multi-mode access point in a coverage area associated with the multi-mode access point using at least a first transceiver that supports a radio access technology having a first type;
determine at least one indication indicative of traffic conditions associated with the radio access technology having the first type based on one or more network attributes that are visible to the multi-mode access point without explicit support from the connected access terminal;
switch the radio access technology that the multi-mode access point uses to provide the service to the connected access terminal to a second type instead of the first type based on the at least one indication;
send, to the connected access terminal, a message via the radio access technology having the first type, the message configured to cause the connected access terminal to disable communication via the radio access technology having the first type and to enable communication via the radio access technology having the second type; and
provide the service to the access terminal connected to the multi-mode access point in the coverage area associated with the multi-mode access point using at least a second transceiver that supports the radio access technology having the second type as a result of the switch in the radio access technology used at the multi-mode access point to provide the service to the connected access terminal, wherein the multi-mode access point corresponds to one node on a wireless network.

55. The non-transitory computer-readable medium of claim 54, wherein:
the first type of radio access technology comprises Wi-Fi technology; and
the second type of radio access technology comprises cellular technology.

56. The non-transitory computer-readable medium of claim 54, wherein the at least one indication is indicative of whether a communication channel established between the multi-mode access point and the access terminal using the first type of radio access technology is congested.

57. The non-transitory computer-readable medium of claim 54, further comprising code for causing the multi-mode access point to:
determine at least one second indication indicative of traffic conditions associated with a wide area network communication link for the multi-mode access point; and
wherein the switch to the second type of radio access technology is further based on the at least one second indication.

58. The non-transitory computer-readable medium of claim 57, further comprising code for causing the multi-mode access point to:
determine at least one third indication indicative of traffic conditions associated with the second type of radio access technology; and
wherein the switch to the second type of radio access technology is further based on the at least one third indication.

59. The non-transitory computer-readable medium of claim 54, further comprising code for causing the multi-mode access point to:
identify the service that the multi-mode access point provides to the access terminal; and
wherein the switch to the second type of radio access technology is further based on the service that the multi-mode access point provides to the access terminal.

60. The non-transitory computer-readable medium of claim 54, further comprising code for causing the multi-mode access point to invoke the switch from the first type of radio access technology to the second type of radio access technology by revoking an Internet Protocol (IP) address associated with the access terminal for communication using the first type of radio access technology.

61. The non-transitory computer-readable medium of claim 54, further comprising code for causing the multi-mode access point to invoke the switch from the first type of radio access technology to the second type of radio access technology by disabling a service set identifier (SSID) advertized by the multi-mode access point for communication using the first type of radio access technology.

62. The non-transitory computer-readable medium of claim 54, further comprising code for causing the multi-mode access point to invoke the switch from the first type of radio access technology to the second type of radio access technology by filtering traffic sent via the first type of radio access technology if the traffic is associated with a media access control (MAC) address assigned to the access terminal.

63. The non-transitory computer-readable medium of claim 54, wherein:
    the first type of radio access technology comprises cellular technology; and
    the second type of radio access technology comprises Wi-Fi technology.

\* \* \* \* \*